(12) United States Patent
Yamauchi et al.

(10) Patent No.: US 9,127,181 B2
(45) Date of Patent: Sep. 8, 2015

(54) TAGGANT PARTICLE GROUP; AND ANTI-COUNTERFEIT INK, ANTI-COUNTERFEIT TONER, ANTI-COUNTERFEIT SHEET, AND ANTI-COUNTERFEIT MEDIUM COMPRISING SAME

(75) Inventors: Tsuyoshi Yamauchi, Tokyo-to (JP); Mitsuru Kitamura, Tokyo-to (JP); Manabu Yamamoto, Tokyo-to (JP); Akiko Kitamura, Tokyo-to (JP); Yoko Sekine, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 0 days.

(21) Appl. No.: 13/991,730

(22) PCT Filed: Nov. 21, 2011

(86) PCT No.: PCT/JP2011/076823
§ 371 (c)(1),
(2), (4) Date: Jun. 5, 2013

(87) PCT Pub. No.: WO2012/077489
PCT Pub. Date: Jun. 14, 2012

(65) Prior Publication Data
US 2013/0260301 A1    Oct. 3, 2013

(30) Foreign Application Priority Data

Dec. 6, 2010    (JP) .................................. 2010-271799

(51) Int. Cl.
*C09D 11/50*    (2014.01)
*B41M 3/14*    (2006.01)
*C09D 11/52*    (2014.01)
*G03G 9/00*    (2006.01)

(52) U.S. Cl.
CPC ................. *C09D 11/50* (2013.01); *B41M 3/14* (2013.01); *C09D 11/52* (2013.01); *G03G 9/00* (2013.01); *B42D 2033/20* (2013.01)

(58) Field of Classification Search
CPC ............................. B41M 3/14; B42D 2033/20
USPC .......................... 436/56; 422/400, 401, 82.05
See application file for complete search history.

(56) References Cited

U.S. PATENT DOCUMENTS 6,200,628 B1    3/2001   Rozumek et al.
2004/0151827 A1    8/2004   Argoitia et al.
(Continued)

FOREIGN PATENT DOCUMENTS

DE    102008051409 A1    4/2010
JP    10-248998 A    9/1998
(Continued)

OTHER PUBLICATIONS

International Search Report; mailed Mar. 6, 2012; PCT/JP2011/076823.

*Primary Examiner* — Sam P Siefke
(74) *Attorney, Agent, or Firm* — Ladas & Parry LLP

(57) ABSTRACT

A main object of the invention is to provide a taggant particle group that has a plurality of authentication steps and an excellent anti-counterfeit effect and can be applied to various anti-counterfeit media. The invention attains the object by providing a taggant particle group which is an aggregate of taggant particles which individually have a plurality of identification information items, wherein one identification information item among the plurality of identification information items possessed by the individual particles is common identification information that is possessed in common by the taggant particles that constitute the taggant particle group, and another identification information item among the plurality of identification information items possessed by the individual particles is non-common identification information of which the authenticity can be determined in combination with other identification information items possessed by other taggant particles that constitute the taggant particle group.

5 Claims, 9 Drawing Sheets

(56) References Cited

U.S. PATENT DOCUMENTS

| | | |
|---|---|---|
| 2005/0239207 A1 | 10/2005 | Gelbart |
| 2008/0130018 A1 | 6/2008 | Steenblik et al. |
| 2009/0028910 A1 | 1/2009 | DeSimone et al. |
| 2011/0018252 A1 | 1/2011 | Petry et al. |
| 2011/0049235 A1 | 3/2011 | Gerigk et al. |

FOREIGN PATENT DOCUMENTS

| | | |
|---|---|---|
| JP | 2001-288698 A | 10/2001 |
| JP | 2002-500244 A | 1/2002 |
| JP | 2002-230512 A | 8/2002 |
| JP | 2003-274834 A | 9/2003 |
| JP | 2005-538233 A | 12/2005 |
| JP | 2007-016235 A | 1/2007 |
| JP | 2007-502339 A | 2/2007 |
| JP | 2007-534067 A | 11/2007 |
| JP | 2008-081744 A | 4/2008 |
| JP | 2008-090319 A | 4/2008 |
| JP | 2008-106278 A | 5/2008 |
| JP | 2008-173862 A | 7/2008 |
| JP | 2008-230228 A | 10/2008 |
| JP | 2009-193069 A | 8/2009 |
| JP | 2010-139866 A | 6/2010 |
| WO | 2004/024836 A1 | 3/2004 |
| WO | 2009071167 A2 | 6/2009 |

TAGGANT PARTICLE GROUP; AND ANTI-COUNTERFEIT INK, ANTI-COUNTERFEIT TONER, ANTI-COUNTERFEIT SHEET, AND ANTI-COUNTERFEIT MEDIUM COMPRISING SAME

TECHNICAL FIELD

The present invention relates to a taggant particle group that has a plurality of authentication steps and an excellent anti-counterfeit effect and can be applied to various anti-counterfeit media.

BACKGROUND ART

Anti-counterfeit techniques for preventing counterfeiting of articles require two features from the purposes thereof. The techniques firstly can easily perform authentication when consumers using an article verify whether the article is an authentic product from the perspective of security or the like of articles, and secondly can also perform more advanced authentication when it is necessary to distinguish an authentic article from sophisticated counterfeit products.

Presently, examples of anti-counterfeit techniques in widely use include watermark techniques, and holograms which allow users to determine authenticity with visual inspections. Although these techniques have an advantage in that they can be verified by visual inspections and thus can be easily authenticated, it is desirable to develop a new anti-counterfeit technique to meet demands for a more improved anti-counterfeit effect.

Thus, anti-counterfeit techniques of determining authenticity by making observation using a simple magnifying mechanism such as a loupe are gathering attention (Patent Literatures 1 to 3). In these techniques, since it is difficult to verify whether an anti-counterfeit technique is applied just at a glance, it is possible to obtain a higher anti-counterfeit effect as compared to anti-counterfeit techniques that can be verified with visual inspections. These techniques have another advantage in that they can be easily identified without requiring special devices and the like in determining authenticity.

As an anti-counterfeit technique that requires a magnifying mechanism when performing such authentication, a technique that uses microscopic particles called taggant particles (tracing additives) is proposed. In anti-counterfeit media using taggant particles, since the positions of taggant particles change among individual media, it is difficult to identify taggant particles themselves and duplicating is also difficult. Thus, the anti-counterfeit media have an excellent anti-counterfeit effect and individual medium can be identified.

Taggant particles having information that can be identified by magnifying and observing the same are known. Examples of such taggant particles include those having characters, symbols, emblems, and a special shape and those having special color information (Patent Literatures 4 and 5).

However, since taggant particles used conventionally are relatively easy to manufacture and high-resolution printing has become possible with progress of printing techniques, the risk of forgery is high when the formation positions of taggant particles are identified. Thus, it is requested to develop taggant particles having a higher anti-counterfeit effect.

CITATION LIST

Patent Literature

Patent Literature 1: Japanese Patent Application Publiccation Laid-Open (JP-A) No. 2003-274834

Patent Literature 2: JP-A No. 2009-193069
Patent Literature 3: JP-A No. 2001-288698
Patent Literature 4: Japanese Patent No. 3665282
Patent Literature 5: JP-A No. 2008-230228

SUMMARY OF INVENTION

Technical Problem

The invention has been made in view of the above problems, and a main object of the invention is to provide a taggant particle group that has a plurality of authentication steps and an excellent anti-counterfeit effect and can be applied to various anti-counterfeit media.

Solution to Problem

In order to solve the above problems, the invention provides a taggant particle group which is an aggregate of taggant particles which individually have a plurality of identification information items, characterized in that one identification information item among the plurality of identification information items possessed by the individual particles is common identification information that is possessed in common by the taggant particles that constitute the taggant particle group, and another identification information item of the plurality of identification information items possessed by the individual particles is non-common identification information of which the authenticity can be determined in combination with other identification information items possessed by other taggant particles that constitute the taggant particle group.

According to the invention, since individual taggant particles in the taggant particle group have the common identification information, when the taggant particle group according to the invention is applied to anti-counterfeit media and the like, it is possible to guarantee authenticity by verifying whether an optional taggant particle present in the taggant particle group has the common identification information. Therefore, it is possible to easily perform authentication without the need to verify the identification information items of a plurality of particles in the taggant particle group.

Moreover, the individual taggant particles have a plurality of identification information items, which include non-common identification information that is different from the common identification information. The non-common identification information can be identified by combining two different identification information items or more, it is possible to perform more advanced authentication by verifying a combination of the identification information expressed by an optional taggant particle and the identification information expressed by another taggant particle. Further, since manufacturing of the taggant particles becomes complicated, it is possible to further reduce the easiness of forgery.

The invention provides an anti-counterfeit ink comprising the above-described taggant particle group.

According to the invention, since the anti-counterfeit ink comprises the above-described taggant particle group, it is possible to manufacture an anti-counterfeit ink that can be used in manufacturing an anti-counterfeit medium that allows more advanced authenticity determination.

The invention provides an anti-counterfeit toner comprising the above-described taggant particle group.

According to the invention, since the anti-counterfeit toner comprises the above-described taggant particle group, it is possible to manufacture an anti-counterfeit toner that can be used in manufacturing an anti-counterfeit medium that allows more advanced authenticity determination.

Moreover, the invention provides an anti-counterfeit sheet comprising the above-described taggant particle group.

According to the invention, since the anti-counterfeit sheet comprises the above-described taggant particle group, it is possible to manufacture an anti-counterfeit sheet that can be used in manufacturing an anti-counterfeit medium that allows more advanced authenticity determination.

The invention provides an anti-counterfeit medium comprising the above-described taggant particle group.

According to the invention, since the anti-counterfeit medium comprises the above-described taggant particle group, the consumers of articles can identify the taggant particle group in a simple manner, and more advanced authentication can be performed when it is necessary to distinguish from sophisticated counterfeit products. Thus, it is possible to manufacture an anti-counterfeit medium that allows advanced authenticity determination.

Advantageous Effects of Invention

According to the invention, since the identification information can be observed by magnifying the same, the anti-counterfeit effect is high. Moreover, since the taggant particle group has a plurality of identification information items, it is possible to provide a plurality of authentication steps of simple identification and advanced identification. Thus, it is possible to perform advanced authenticity determination. Moreover, the taggant particle group can be easily applied to various anti-counterfeit materials and various anti-counterfeit media.

BRIEF DESCRIPTION OF DRAWINGS

FIGS. 15A and 158 are each a schematic view illustrating an example of an anti-counterfeit medium according to the invention.

DESCRIPTION OF EMBODIMENTS

Figure 1A:
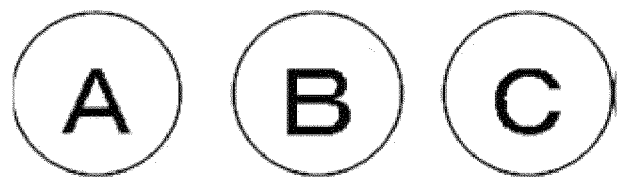
FIGS. 1A to 1F are each a schematic view illustrating an example of a combination of identification information items of a taggant particle.

Hereinafter, a taggant particle group, an anti-counterfeit ink, an anti-counterfeit toner, an anti-counterfeit sheet, and an anti-counterfeit medium according to the invention will be described.

A. Taggant Particle Group

A taggant particle group according to the invention will be described. The taggant particle group according to the invention is a taggant particle group which is an aggregate of taggant particles which individually have a plurality of identification information items, characterized in that one identification information item among the plurality of identification information items possessed by the individual particles is common identification information that is possessed in common by the taggant particles that constitute the taggant particle group, and another identification information item of the plurality of identification information items possessed by the individual particles is non-common identification information of which the authenticity can be determined in combination with other identification information items possessed by other taggant particles that constitute the taggant particle group.

According to the invention, since individual taggant particles in the taggant particle group have the common identification information, when the taggant particle group is applied to anti-counterfeit media and the like, it is possible to guarantee authenticity by verifying whether an optional taggant particle present in the taggant particle group has the common identification information. Therefore, it is possible to easily perform authentication without the need to verify the identification information items of a plurality of particles in the taggant particle group.

Moreover, the individual taggant particles have a plurality of identification information items, which include non-common identification information that is different from the common identification information. Since the non-common identification information can be identified by combining two different identification information items or more, it is possible to perform more advanced authentication by verifying a combination of the identification information expressed by an optional taggant particle and the identification information expressed by another taggant particle.

Further, since manufacturing of the taggant particles becomes complicated, it is possible to reduce the easiness of forgery.

Hereinafter, the taggant particle group according to the invention will be described.

1. Common Identification Information

First, common identification information used in the invention will be described. The common identification information used in the invention is one of a plurality of identification information items possessed by individual taggant particles, and taggant particles that constitute a taggant particle group have the same common identification information.

Since individual taggant particles in the taggant particle group have the common identification information, when the taggant particle group according to the invention is applied to anti-counterfeit media and the like, it is possible to guarantee authenticity by verifying whether an optional taggant particle present in the taggant particle group has the common identification information. Therefore, it is possible to easily perform authentication without the need to verify the identification information items of a plurality of particles in the taggant particle group.

Incidentally, examples of identification information items that can be used as the common identification information include a shape, a color, a size, and a mark. The respective identification information items will be described in Section "3. Identification Information Item" described later, and description thereof will not be provided here.

Here, the common identification information will be described with reference to the drawings. FIGS. 1A to 1F are each a schematic view illustrating an example of a combination of identification information items of the taggant particle. As illustrated in FIG. 1A, a shape (circle) and a color (white) are common identification information items, and marks (characters A, B, and C) are different. Thus, it is possible to easily perform authentication by verifying that an optional taggant particle in the taggant particle group has a predetermined shape (circle) and a predetermined color (white) which are the predetermined common identification information items.

Figure 1B:
Figure 1C:
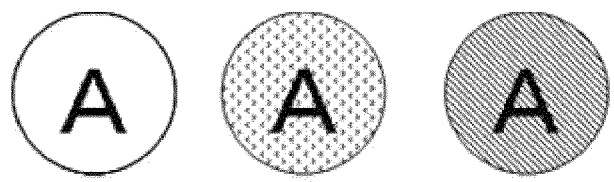

Moreover, as illustrated in FIG. 1B, a color (white) and a mark (character A) are common identification information items, and shapes (circle, tetragon, and hexagon) are different. In FIG. 1C, a shape (circle) and a mark (character A) are common identification information items, and colors are different.

Figure 1D:
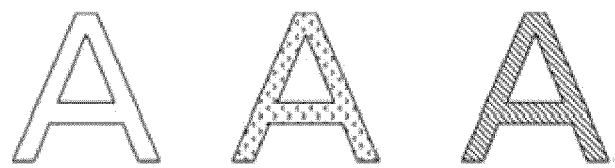
Figure 1E:
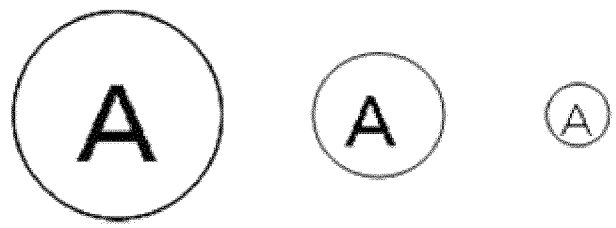
Figure 1F:
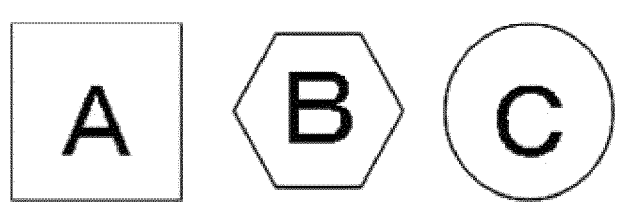

Further, as illustrated in FIG. 1D, a shape (character A) is the common identification information, and colors are different. In FIG. 1E, a shape (circle), a color (white), and a mark (character A) are common identification information items, and sizes are different. In FIG. 1F, a color (white) is the common identification information, and shapes (circle, tetragon, and hexagon), and marks (characters A, B, and C) are different.

Although the common identification information is not particularly limited as long as the common identification information is the identification information described later, a shape and a mark are preferable among the identification information items, and in particular, a shape is more preferable. This is because the shape can be easily identified using a simple magnifying mechanism such as a loupe.

Moreover, one identification information item may be used as the common identification information, and two or more identification information items may be used as the common identification information.

2. Non-Common Identification Information

The non-common identification information used in the invention is identification information which is different from the above-described common identification information among the plurality of identification information items possessed by the individual particles, and of which the authenticity can be determined in combination with other identification information items possessed by other taggant particles that constitute the taggant particle group.

The individual taggant particles have a plurality of identification information items, which include non-common identification information that is different from the common identification information. Here, identification information described later can be used as the identification information similarly to the common identification information.

Since the non-common identification information can be identified by combining two different identification information items, it is possible to perform more advanced authentication by verifying a combination of the identification information expressed by an optional taggant particle and the identification information expressed by another taggant particle.

Moreover, since manufacturing of the taggant particles becomes complicated, it is possible to reduce the easiness of forgery.

As illustrated in FIG. 1A, the taggant particle group uses a shape (circle) and a color (white) as its common identification information, and has marks (characters A, B, and C) as its non-common identification information. By verifying all taggant particles having the non-common identification information items which are the marks "A", "B", and "C" in the taggant particle group, it is possible to determine authenticity in a more advanced manner.

Moreover, as illustrated in FIG. 1B, the taggant particle group uses a color (white) and a mark (character A) as the common identification information items and has shapes (circle, tetragon, and hexagon) as the non-common identification information items. By verifying all taggant particles having the non-common identification information items which are the shapes of circle, tetragon, and hexagon in the taggant particle group, it is possible to determine authenticity in a more advanced manner.

Moreover, as illustrated in FIG. 1C, the taggant particle group has a shape (circle) and a mark (character A) as the common identification information items and has a color as the non-common identification information. By verifying all taggant particles having different colors in the taggant particle group, it is possible to determine authenticity in a more advanced manner.

Further, in addition to the above-described combinations of identification information items, various combinations of identification information items may be taken into consideration as illustrated in FIGS. 1D to 1F.

In FIG. 1D, the taggant particle group has a shape (character A) as its common identification information and has a color as its non-common identification information. In FIG. 1E, the taggant particle group has a shape (circle), a mark (character A), and a color (white) as its common identification information items and has a size as its non-common identification information.

Further, in FIG. 1F, the taggant particle group has a color (white) as its common identification information and has shapes (circle, tetragon, and hexagon) and marks (characters A, B, and C) as its non-common identification information items.

Although the non-common identification information is not particularly limited as long as the non-common identification information is the identification information described later, a shape, a mark, and a color are preferable, and above all, a shape and a mark are more preferable. This is because the shape and the mark can be easily combined with other identification information items.

Moreover, one identification information item may be used as the non-common identification information, and two or more identification information items may be used as the non-common identification information.

Further, for the purpose of further improving the anti-counterfeit effect, in addition to the identification information that can be identified using a simple mechanism, identification information that can be identified using a measuring device or the like may be used as the identification information used as the non-common identification information.

The non-common identification information in the taggant particle group according to the invention is not particularly limited as long as the non-common identification information expresses at least two or more identification information items. As for presence rate of the taggant particles that express different identification information items, taggant particles that express two or more identification information items may be present substantially by the same rate and may be present by different rates. Above all, it is preferable that the presence rates are different. This is because it becomes difficult to identify non-common identification information items, and the anti-counterfeit effect is improved, which enables more advanced authentication.

For example, when identifying non-common identification information items, if there are taggant particles that express two identification information items in the taggant particle group, the presence rate of the taggant particles having different identification information items is preferably in the range of 100:1 to 1:1, and above all, is more preferably in the range of 20:1 to 1:1.

This is because, by setting the presence ratio in the above-described range, the non-common identification information can be suitably identified in the taggant particle group.

3. Identification Information Item

Next, the identification information item used in the invention will be described. The identification information item used in the invention is information item that can be identified by magnifying the same, and above all, information item that can be identified using a simple mechanism is preferable. Individual taggant particles included in the taggant particle group according to the invention have a plurality of identification information items and are used as the common identification information and the non-common identification information described above.

Examples of such identification information items include a shape, a size, a mark, and a color.

Hereinafter, respective identification information items will be described.

(1) Shape

The shape used in the invention is not particularly limited as long as the identification information item can be identified by magnifying and observing the same, and the shape may be a planar shape or may be a solid shape. Examples of the planar shape include a sheet-shape and a film-shape. Moreover, the solid shape may be made up planes only, curved surfaces only, or may be made up of a plane and a curved surface.

The solid shape having a plane is not particularly limited as long as the solid shape has a plane, and may be made up of planes only or may be made up of a plane and a curved surface. Examples of the solid shape include a cylinder and a cone. When the solid shape is the cylinder, the cone, and the like, examples of the plan-view shape of the solid shape include a character, a symbol, and an emblem in addition to a polygonal shape such as a triangular shape or a tetragonal shape and a geometric shape such as a circle or an ellipse.

The shape having a curved surface is not particularly limited as long as the shape has a curved surface, and may be made up of curved surfaces only or may be made up of a curved surface and a plane.

Here, the curved surface can be verified by measuring reflecting properties. A plane has only one normal direction, whereas a curved surface has different normal directions depending on a position. Thus, the light reflected from a plane and a curved surface has different brightness. Moreover, when the incidence angle of light is changed, a change in the brightness of the light reflected from the plane and the curved surface is also different.

The curved surface can be verified by a destructive or non-destructive inspection method.

An example of a destructive inspection method involves cutting a taggant particle using a cutter, a razor, a microtome, or the like, and verifying the curved surface by magnifying and observing the same using a loupe, a microscope, or the like.

An example of a non-destructive inspection method involves verifying the curved surface by performing contact or non-contact-type shape measurement. An example method of the contact-type shape measurement uses a stylus-type shape measuring instrument that measures a shape by moving a needle that is brought into contact with a taggant particle. An example method of the non-contact-type shape measurement uses a scanning white interferometer that measures a shape according to a method that uses white light having small coherence as a light source and uses a Mirau or Michelson-type iso-intensity interferometer or other types of interferometers to vertically scan an objective lens of the interferometer to find an equal optical path position (position having maximum interference intensity) of each pixels of a CCD corresponding to a measurement surface.

Moreover, the taggant particle used in the invention generally has a front surface and a rear surface opposite to the front surface and may further have side surfaces. When the solid shape having a curved surface in the invention has a curved surface on at least a front surface of the taggant particle, 50% or more of the front surface of the taggant particle is preferably made up of a curved surface, and more preferably, 75% or more of the front surface is made up of a curved surface.

This is because the higher the percentage of the curved surface on the front surface of the taggant particle, the easier it is to verify the solid shape based on reflection of light, and the taggant particle can be easily identified.

Incidentally, as for the percentage of the curved surface, the curved surface can be verified according to the destructive or non-destructive inspection method.

An optional solid shape such as a person, an animal, plants, food, a tool, a vehicle, a building, a landscape, a character, a number, a logo, a trademark, a symbolic language can be used as the solid shape and is appropriately selected according to the purpose of the taggant particle.

In the taggant particle used in the invention, a shape formed by combining the cylinder, the cone, and the solid shape can be also used.

(2) Size

The size of the identification information item used in the invention is not particularly limited as long as the identification information item can be identified by magnifying and observing the same, and specifically, the size is preferably 300 μm or smaller and is more preferably 250 μm or smaller.

This is because, if the identification information item is too large, the identification information item can be identified by visual inspections, and the risk of easiness of forgery increases. Moreover, the size of the identification information item is preferably set to such a value that the identification information item can be observed using a simple magnifying mechanism such as a loupe, and specifically, the size is preferably 50 μm or larger. However, if the size of the identification information item is smaller than 50 μm, the identification information item can be identified using a high-precision magnifying mechanism such as a microscope. Thus, when a higher importance is placed on confidentiality and forgery difficulty as compared to authentication easiness, the lower limit of the size of the identification information item is appropriately selected according to the purpose or the like of the taggant particle group or an anti-counterfeit medium or the like that uses the taggant particle group.

(3) Mark

Examples of the mark used in the invention include a character, a number, a logo, an emblem, a symbolic language. The mark is appropriately selected according to the purpose or the like of the taggant particle, and a mark that expresses a predetermined meaning can be used.

The size of a mark is not particularly limited as long as the mark can be observed by magnifying the same, and specifically, the size is preferably 300 μm or smaller, and more preferably is 250 μm or smaller.

This is because, if the mark is too large, the identification information item can be identified with the visual inspections, and the risk of easiness of forgery increases. Moreover, the size of the mark is preferably set to such a value that the identification information item can be observed using a simple magnifying mechanism such as a loupe, and specifically, the size is preferably 50 μm or larger. However, if the size of the mark is smaller than 50 μm, the identification information item can be identified using a high-precision magnifying mechanism such as a microscope. Thus, when a higher importance is placed on confidentiality and forgery difficulty as compared to authentication easiness, the lower limit of the size of the mark is appropriately selected according to the purpose or the like of the taggant particle group or an anti-counterfeit medium or the like that uses the taggant particle group.

A method of forming such a mark is not particularly limited as long as the method can form a desired mark in a portion of the front surface of the taggant particle. For example, a method of forming a mark when manufacturing the taggant particle and a method of forming a mark after the taggant particle is manufactured can be used. An example of the method of forming a mark when manufacturing the taggant particle involves forming a mark when forming the shape of a taggant particle according to a direct laser drawing method or a photolithography method using a gradation mask. Moreover, an example of the method of forming a mark after the taggant particle is manufactured involves forming a mark in a portion of the taggant particle according to a printing method or a shape transcription method.

(4) Color

The identification information item according to the invention may or may not have a color and may have colors that change in response to ultraviolet rays, and the color is appropriately selected according to the material of the taggant particle described later.

4. Taggant Particle

Next, the taggant particle according to the invention will be described. The taggant particle used in the invention has a plurality of identification information items.

The taggant particle according to the invention will be described with reference to the drawings.

Figure 2A:
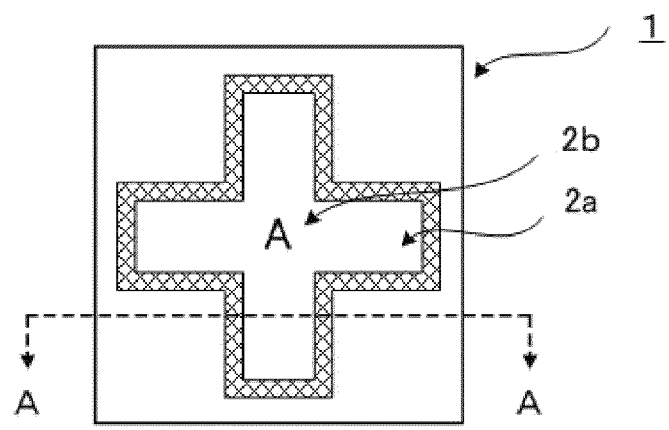
FIGS. 2A and 2B are each a schematic view illustrating an example of a taggant particle used in the invention.
Figure 2B:
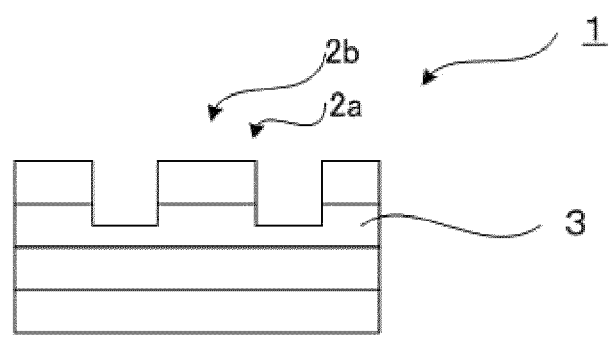

FIGS. 2A and 2B are schematic views illustrating an example of a taggant particle according to the invention, in which FIG. 2A is a plan view and FIG. 2B is a cross-sectional view along line A-A in FIG. 2A. The taggant particle 1 illustrated in FIGS. 2A and 2B is one in which recesses are formed on a surface of a multilayer metal film 3 in a pattern form and has a plurality of identification information items that includes identification information 2a (cross-shape) and identification information 2b (character A).

For example, when the identification information 2a (cross-shape) is used as the common identification information, it is possible to perform simple authentication by verifying that an optional taggant particle in the taggant particle group has the identification information 2a (cross-shape). Moreover, when the identification information 2b (character A) is used as the non-common identification information, it is possible to perform advanced authentication by verifying a combination of the taggant particle 1 and another taggant particle in the taggant particle group, having the predetermined identification information 2b (for example, character B) as its non-common identification information.

Figure 3A:
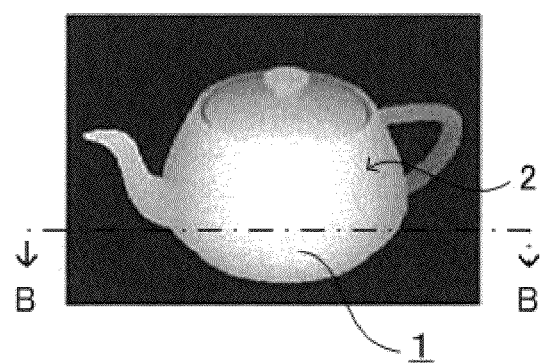
FIGS. 3A and 3B are each a schematic view illustrating another example of a taggant particle used in the invention.
Figure 3B:
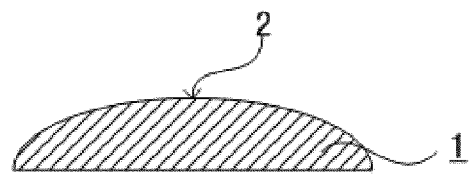

Moreover, FIGS. 3A and 3B are schematic views illustrating another example of the taggant particle according to the invention, in which FIG. 3A is a top view and FIG. 3B is a cross-sectional view along line B-B in FIG. 3A. The taggant particle 1 illustrated in FIGS. 3A and 3B has a plurality of identification information items that include identification information 2 (solid shape of a tea pot) and a color (white) which is identification information (not illustrated).

For example, when the identification information 2 (solid shape of a tea pot) is used as the common identification information, it is possible to perform simple authentication by verifying that an optional taggant particle in the taggant particle group has the identification information 2 (solid shape of a tea pot). Moreover, when a color (white) which is identification information is used as the non-common identification information, it is possible to perform advanced authentication by verifying a combination of the taggant particle 1 and another taggant particle in the taggant particle group, having the color (for example, blue) which is predetermined identification information as its non-common identification information.

Figure 4A:
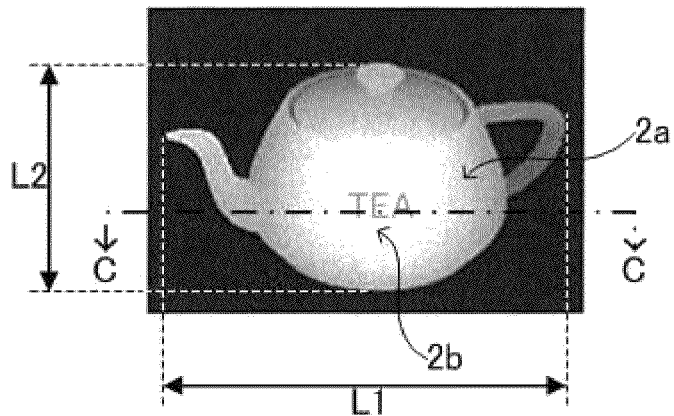
FIGS. 4A and 4B are each a schematic view illustrating another example of a taggant particle used in the invention.
Figure 4B:
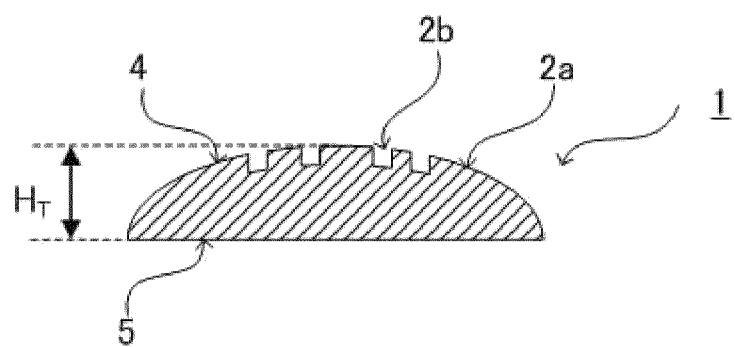

FIGS. 4A and 4B are schematic views illustrating another example of the taggant particle according to the invention, in which FIG. 4A is a top view and FIG. 4B is a cross-sectional view along line C-C in FIG. 4A. The taggant particle 1 illustrated in FIGS. 4A and 4B has a solid shape on its front surface 4 and has identification information items 2a (solid shape of a tea pot) and 2b (character TEA).

For example, when the identification information 2a (solid shape of a tea pot) is used as the common identification information, it is possible to perform simple authentication by verifying that an optional taggant particle in the taggant particle group has the identification information 2a (solid shape of a tea pot). Moreover, when the identification information 2b (character TEA) is used as the non-common identification information, it is possible to perform advanced authentication by verifying a combination of the taggant particle 1 and another taggant particle in the taggant particle group, having the predetermined identification information 2b (for example, character POD) as its non-common identification information.

Moreover, in this example, a thickness $H_T$ of a cross-section approximately vertical to a rear surface 5 of the taggant particle 1 is defined as the thickness of the taggant particle. The particle size of the taggant particle represents the particle size of the taggant particle in a plan view of the front surface of the taggant particle. When the taggant particle has a larger diameter L1 and a shorter diameter L2 as illustrated in FIG. 4A, the larger diameter L1 is defined as the particle size of the taggant particle.

Figure 6A:
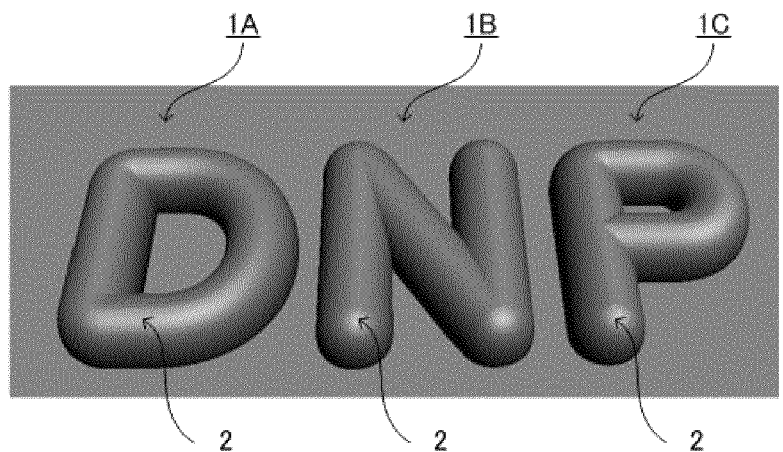
FIGS. 6A to 6C are each a schematic view illustrating another example of a taggant particle used in the invention.
Figure 6B:
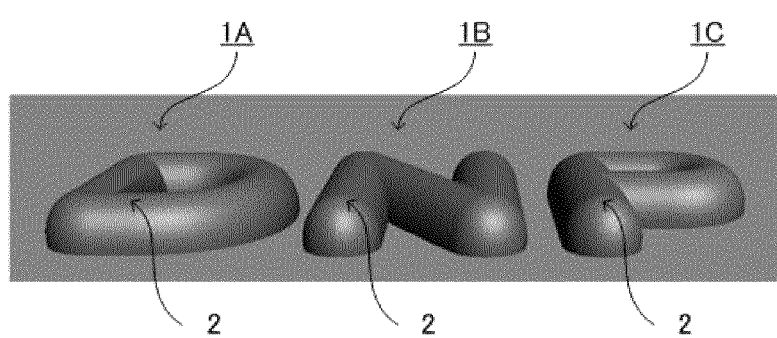
Figure 6C:
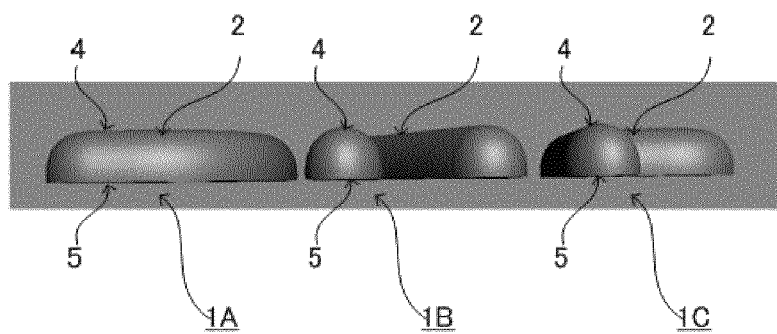

Moreover, FIGS. 6A to 6C are schematic views illustrating another example of the taggant particle according to the invention, in which FIGS. 6A and 6B are perspective views and FIG. 6C is a side view. The taggant particles 1A to 1C illustrated in FIGS. 6A to 6C each have a front surface 4 and a rear surface 5 and have identification information items 2 (solid shapes of characters D, N, and P) on the front surface 4.

(1) Identification Information Item

The identification information item possessed by the taggant particle has been described in Section "3. Identification Information item", and description thereof will not be provided here.

(2) Material

A material of the taggant particle is not particularly limited as long as the material can manufacture a desired taggant particle, and metal, a resin material, and the like can be used.

Moreover, examples of the resin material include a curable resin material such as a photo-curable resin or a thermosetting resin, a thermoplastic resin material, and a photo-sensitive resin material. Moreover, the metal is not particularly limited as long as the metal can form a film according to a deposition method, a plating method, or the like.

Above all, a resin material is preferred as the material of the taggant particle. This is because it is possible to impart identification information item other than a shape to the taggant particle by adding a functional material such as an ultraviolet emitting material, an infrared emitting material, or a coloring material as described below to the resin material. Thus, since it is possible to facilitate authenticity determination and to perform advanced authentication by combining with other identification information items, it is possible to obtain an excellent anti-counterfeit effect.

Resin materials having solvent resistance are preferable, and above all, materials exhibiting insolubility to a solvent used when forming a taggant particle-containing layer in which the taggant particle is dispersed in a transparent resin using a taggant particle are more preferable.

Among these resin materials, a photosensitive resin material is ideally used. This is because the photosensitive resin material can be manufactured with high productivity using a photolithography method exemplified as a manufacturing method described later.

As the photosensitive resin material, both a positive photosensitive resin material and a negative photosensitive resin material can be used.

Figure 5:
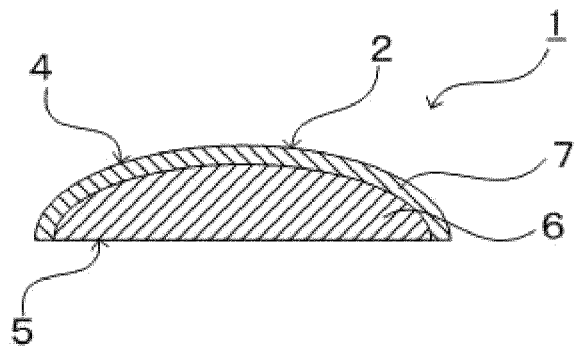
FIG. 5 is a cross-sectional view illustrating another example of a taggant particle used in the invention.

Moreover, as illustrated in FIG. 5, the taggant particle according to the invention may preferably comprise a resin layer 6 and a metal layer 7 formed on the resin layer 6 and on the front surface 4 of the taggant particle 1. This is because, when metal layer is formed on the front surface of the taggant particle having identification information item, it is possible to easily visually perceive the identification information item based on reflection of light, to facilitate authenticity determination, and to improve the anti-counterfeit effect. In particular, when a taggant particle-containing layer in which a taggant particle is dispersed in a transparent resin is formed using the taggant particle according to the invention, and the taggant particle is made from a resin, since the refractive index difference between the taggant particle and the transparent resin is small, it is difficult to visually perceive the interface between the taggant particle and the transparent resin and to visually perceive the identification information of the taggant particle. However, since the metal layer is formed on the front surface of the taggant particle, it is possible to improve the visibility of the identification information item.

When a resin material is used as the material of the taggant particle, the resin material preferably contains a functional material. This is because it becomes easy to impart identification information item other than a shape to the taggant particle. Examples of the functional material include an ultraviolet emitting material, an infrared emitting material, an infrared reflecting material, an infrared absorbing material, a quantum dot material, a magnetic material, and a coloring material such as a pigment.

Among these materials, an ultraviolet emitting material, an infrared emitting material, an infrared reflecting material, an infrared absorbing material, and the like are ideally used. This is because the identification information item can be identified using a simple mechanism and using emission, reflection, and absorption of light, and authenticity determination becomes easy.

Hereinafter, respective functional materials will be described.

(i) Ultraviolet Emitting Material

As the ultraviolet emitting material, materials that emit fluorescent light by absorbing ultraviolet rays can be used. An optional ultraviolet emitting material such as a material that emits light by absorbing light in a short wavelength range (approximately 200 nm to 300 nm) and a material that emits light by absorbing light in a long wavelength range (approximately 300 nm to 400 nm) can be used. This ultraviolet emitting material is a material which is excited with ultraviolet rays and in which the peak emission spectra when the energy level returns to a lower level are in a wavelength range of blue, green, red, and the like, and the material can be appropriately selected according to the purpose. Specific examples thereof include $Ca_2B_5O_9Cl:Eu^{2+}$, $CaWO_4$, $ZnO:Zn$, $Zn_2SiO_4:Mn$, $Y_2O_2S:Eu$, $ZnS:Ag$, $YVO_4:Eu$, $Y_2O_3:Eu$, $Gd_2O_2S:Tb$, $La_2O_2S:Tb$, $Y+Al_5O_{12}:Ce$, $Sr_5(PO_4)_3Cl:Eu$, $3(Ba,Mg)O.8Al_2O_3:Eu$, $Zn_2GeO_4:Mh$, $Y(P,V)O_4:Eu$, $0.5MgF_2.3.5MgO.GeO_2:Mn$, $ZnS:Cu$, and $ZnS:Mn$. These ultraviolet emitting materials may be used solely and two or more ultraviolet emitting materials may be used. Incidentally, the composition of the ultraviolet emitting material is expressed by connecting a main component and an activator or an emission center with ":".

The content of the ultraviolet emitting material in the taggant particle is not particularly limited as long as the identification information item can be identified using light emission and the content may be in a range of approximately 1 mass % to approximately 50 mass %.

(ii) Infrared Emitting Material

As the infrared emitting material used in the invention, materials that emit fluorescent light by absorbing infrared rays can be used. The infrared emitting material is a material which is excited with infrared rays (approximately 800 nm to 1200 nm) and emits visible light (approximately 400 nm to 800 nm), and the material can be appropriately selected according to the purpose. Specific examples thereof include $YF_3:Yb+Er$, $YF_3:Yb+Tm$, and $BaFCl:Yb+Er$. Incidentally, the composition of the infrared emitting material is expressed by connecting a main component and an activator or an emission center with ":".

The content of the infrared emitting material in the taggant particle is not particularly limited as long as the identification information item can be identified using light emission and the content may be in a range of approximately 1 mass % to approximately 50 mass %.

(iii) Infrared reflecting Material

As the infrared reflecting material, materials having wavelength-selective reflecting properties to infrared rays can be used, and examples thereof include a multilayer structure material, an infrared reflecting pigment, and a liquid crystal material having a cholesteric structure. The wavelength of infrared rays that the infrared reflecting material reflects is not particularly limited, and the wavelength is generally 800 nm to 2500 nm.

An example of the multilayer structure material is made up of layers (infrared reflecting layers) having an infrared reflecting surface, formed at such intervals that the layers reflect infrared rays. The multilayer structure material is configured to reflect infrared rays of a specific wavelength using the Bragg reflection of respective layers (infrared reflecting layers).

Specifically, the infrared reflecting layer can be formed using a multilayer liquid crystal material having a fixed cholesteric structure like the cross-linking structure of a cholesteric liquid crystal.

Powder or particles of an infrared reflecting material are used as the infrared reflecting pigment, and both an inorganic pigment and an organic pigment can be used. Examples of an inorganic pigment include a complex metal oxide such as titanium oxide ($TiO_2$), zinc oxide, zinc sulfide, white lead, antimony oxide, zirconium oxide, indium tin oxide (ITO), or antimony-doped tin oxide (ATO), and metals such as aluminum, gold, or copper. Moreover, examples of the inorganic pigment include an interference pigment made up of a coating of a metal oxide and a transparent support material such as natural or synthetic mica, another phyllosilicate, flake glass, flaky silicon dioxide or aluminum oxide, as disclosed in JP-A No. 2004-004840. On the other hand, examples of the organic pigment include those organic pigments such as azo pigments, anthraquinone pigments, phthalocyanine pigments, perynone-perylene pigments, indigo pigments, thioindigo pigments, dioxazine pigments, quinacridone pigments, isoindolinone pigments, isoindoline pigments, diketopyrrolopyrrole pigments, azomethine pigments, and azomethine-azo pigments, as disclosed in JP-A No. 2005-330466 and JP-A No. 2002-249676.

Examples of the crystal material (so-called cholesteric liquid crystal material) having the cholesteric structure include chiral nematic liquid crystal materials in which chiral agents are mixed into nematic liquid crystals and polymer cholesteric liquid crystal materials.

The content of the infrared reflecting material in the taggant particle is not particularly limited as long as the identification information item can be identified based on reflection of infrared rays, and the content may be in a range of approximately 0.1 mass % to approximately 50 mass %.

(iv) Infrared Absorbing Material

Example materials of the infrared absorbing material are not particularly limited as long as the materials can absorb infrared rays (800 nm to 1100 nm). Among these materials, infrared absorbing materials that absorb light in the wavelength range of 800 nm to 1100 nm and have small absorptance and sufficient light transmittance in the visible range (that is, the wavelength range of 380 nm to 780 nm) are preferable.

Examples of the infrared absorbing material include organic infrared absorbing materials such as polymethine-based compounds, cyanine-based compounds, phthalocyanine-based compounds, naphthalocyanine-based compounds, naphthoquinone-based compounds, anthraquinone-based compounds, dithiol-based compounds, immonium-based compounds, diimmonium-based compounds, aminium-based compounds, pyrylium-based compounds, serilium-based compounds, squarylium-based compounds, copper complexes, nickel complexes, dithiol-based metal complexes, and the counterion conjugates between benzenedithiol metal complex anions and cyanine-based dye cations as disclosed in JP-A No. 2007-163644; and inorganic infrared absorbing materials such as composite tungsten oxide, tin oxide, indium oxide, magnesium oxide, titanium oxide, chromium oxide, zirconium oxide, nickel oxide, aluminum oxide, zinc oxide, iron oxide, ammonium oxide, lead oxide, bismuth oxide, lanthanum oxide, tungsten oxide, and indium tin oxide (ITO), as disclosed in JP-A No. 2006-154516. The infrared absorbing materials can be used singly or in combination of two or more kinds. Meanwhile, the term "-based compounds" means, for example, in the case of anthraquinone-based compounds, anthraquinone derivatives.

Moreover, preferably, the infrared absorbing material is appropriately selected according to the kind of a resin used. For example, when a photo-curable resin material or a photosensitive resin material is used, an inorganic near-infrared absorbing material such as a composite tungsten oxide can be preferably used as the infrared absorbing material.

The content of the infrared absorbing material in the taggant particle is not particularly limited as long as the identification information item can be identified based on absorption of infrared rays, and the content is preferably in a range of 0.1 mass % to 10 mass %. This is because, when the content of the infrared absorbing material is in the above range, it is possible to obtain a sufficient infrared absorbing function and to transmit a sufficient amount of visible light.

(v) Quantum Dot Material

A quantum dot material is a semiconductor nanometer-size taggant particle, exhibits unique optical and electrical properties due to a quantum confinement effect (quantum size effect) wherein electrons and exciters are confined in a small nanometer-size crystal, and is also referred to as a semiconductor nanoparticle or a semiconductor nanocrystal.

The quantum dot material used in the invention is a semiconductor nanometer-size fine particle and is not particularly limited as long as the material causes the quantum confinement effect (quantum size effect). Examples thereof include a semiconductor fine particle of which the emission color is regulated by its particle size and a semiconductor fine particle having dopants.

The quantum dot material may be made up of a single semiconductor compound and may be made up of at least two semiconductor compounds. For example, the quantum dot material may have a core-shell structure that includes a core made up of a semiconductor compound and a shell made up of another semiconductor compound different from the core. A typical example thereof includes a core formed from CdSe, a ZnS shell provided around the core, and a protective material (sometimes called a capping material) provided around the shell. The quantum dot materials have different emission colors according to their particle sizes. For example, quantum dot materials made up of only a core formed from CdSe have fluorescent spectrum peak wavelengths at 528 nm, 570 nm, 592 nm, and 637 nm for particle sizes of 2.3 nm, 3.0 nm, 3.8 nm, and 4.6 nm, respectively.

Specific examples of the core material of the quantum dot material include: semiconductor compounds such as II-VI semiconductor compounds such as MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, or HgTe, III-V semiconductor compounds such as AlN, AlP, AlAs, AlSb, GaAs, GaP, GaN, GaSb, InN, InAs, InP, InSb, TiN, TiP, TiAs, or TiSb, or IV semiconductors such as Si, Ge, or Pb; or semiconductor crystals that contain semiconductors. Moreover, semiconductor crystals that contain a semiconductor compound that includes three elements or more such as InGaP can be also used.

Further, as the quantum dot material made up of semiconductor fine particles having dopants, semiconductor crystals obtained by doping the semiconductor compounds with cations of rare-earth metal such as $Eu^{3+}$, $Tb^{3+}$, $Ag^+$, or Cu+ or cations of transition metal can be used.

Among these materials, semiconductor crystals such as CdS, CdSe, CdTe, InP, or InGaP are preferable from the perspective of easiness of manufacturing, controllability of particle sizes to obtain visible light emission, and fluorescence quantum yield.

When a core-shell quantum dot material is used, by using a material having a higher bandgap than a semiconductor compound that forms the core so that exciters are confined in the core as the semiconductor that constitutes the shell, it is possible to improve the emission efficiency of the quantum dot material.

Examples of a core-shell structure (core/shell) having such a bandgap magnitude correlation include CdSe/ZnS, CdSe/ZnSe, CdSe/CdS, CdTe/CdS, InP/ZnS, Gap/ZnS, Si/ZnS, InN/GaN, InP/CdSSe, InP/ZnSeTe, InGaP/ZnSe, InGaP/ZnS, Si/AlP, InP/ZnSTe, InGaP/ZnSTe, and InGaP/ZnSSe.

The size of a quantum dot is appropriately controlled by a material that constitutes the quantum dot so that light of a desired wavelength is obtained. The smaller the particle size of a quantum dot, the larger the energy band gap becomes. That is, as the crystal size decreases, the emission wavelength of the quantum dot shifts toward the blue side (that is, toward the high energy side). Thus, by changing the quantum dot size, the emission wavelength can be adjusted over the entire spectrum wavelength region of the ultraviolet region, the visible region, and the infrared region.

In general, the quantum dot particle size (diameter) is preferably in a range of 0.5 nm to 20 nm, and particularly preferably, in a range of 1 nm to 10 nm. Incidentally, the narrower the quantum dot size distribution, the clearer emission color can be obtained.

Moreover, the shape of the quantum dot is not particularly limited, and for example, a spherical shape, a rod shape, a disk shape, and other shapes may be used. When the quantum dot is not spherical, the quantum dot particle size may have the value of a true sphere having the same volume.

Information such as a particle size, a shape, and a dispersion state of quantum dots can be obtained using a transmission electron microscope (TEM). Moreover, the crystal structure and the particle size of the quantum dots can be obtained using X-ray crystal diffraction (XRD). Moreover, information on the particle size and the surface of the quantum dots can be obtained from ultraviolet-visible (UV-Vis) absorption spectra.

The content of the quantum dot materials in the taggant particle is not particularly limited as long as the identification information item can be identified using light emission, and the content may be in a range of approximately 0.1 mass % to approximately 50 mass %.

(vi) Magnetic Material

As the magnetic material, materials that exhibit magnetic resonance such as nuclear magnetic resonance (NMR), nuclear quadrupole resonance (NQR), electron spin resonance (SSR), ferromagnetic resonance, antiferromagnetic resonance, ferrimagnetic resonance, magnetic domain wall resonance, spin-wave resonance, or spin-echo resonance can be used.

Since the resonance frequency is determined by a gyromagnetic ratio γ which is a parameter unique to a nucleus and a magnetic intensity of an external magnetic field, by selecting a resonance frequency at which the magnetic material exhibits magnetic resonance, it is possible to recognize the presence of the taggant particle according to the invention and to perform authenticity determination.

For example, when a taggant particle that contains a magnetic material and a taggant particle that does not contain a magnetic material are irradiated with an electromagnetic wave having the frequency at which the magnetic material exhibits nuclear magnetic resonance, resonant absorption occurs in the taggant particle that contains the magnetic material, whereas resonant absorption does not occur in the taggant particle that does not contain the magnetic material. Thus, by observing the resonant absorption, it is possible to recognize the presence of the taggant particle and to perform authenticity determination. Moreover, in the obtained NMR spectra, since the position, intensity, half-value width, shape, and the like of the signal are different according to the structure of a substance and an energy state, it is possible to identify the presence based on the kind of the magnetic material used.

Magnetic powder or particles are used as the magnetic material. Fine particles that exhibit magnetic resonance as disclosed in JP-A No. 2005-309418 are examples of the magnetic material.

Although the content of the magnetic material in the taggant particle is not particularly limited as long as the identification information item can be identified using magnetic resonance, the content is preferably in a range of 1 mass % to 30 mass %, and more preferably, in a range of 5 mass % to 20 mass %. This is because it may be difficult to identify the identification information item if the content of the magnetic material is smaller than the above range, and it may be difficult to form a solid shape on the surface of the taggant particle if the content is larger than the above range.

(vii) Coloring Material

Examples of the coloring material used in the invention include pigments and dyes.

The coloring material is not particularly limited as long as the material can be contained in the taggant particle, and general pigments and dyes can be used.

The content of the coloring material in the taggant particle may be in a range of approximately 0.1 mass % to approximately 50 mass %.

(3) Manufacturing Method

A method of manufacturing the taggant particle is not particularly limited as long as the method can manufacture a desired taggant particle, and a general taggant particle manufacturing method can be used. As an example of a general manufacturing method, a solvent-soluble sacrificial layer is applied to a substrate, a photosensitive resin material is applied as a taggant material, and an exposure and developing process is performed according to a photolithography method so that only a desired taggant particle pattern shape remains on the sacrificial layer. Subsequently, the sacrificial layer is dissolved so that the taggant particles are separated and collected.

(4) Taggant Particle

The particle size of the taggant particle according to the invention is not particularly limited as long as the taggant particles can be observed by magnifying the same. Above all, it is preferable that the taggant particles can be observed using a simple magnifying mechanism such as a loupe, and specifically, the particle size is preferably 300 μm or smaller and is more preferably in a range of 50 μm to 250 μm.

This is because, if the taggant particle size is too large, the taggant particles can be observed by visual inspections, the position of the taggant particle is easily identified when the taggant particles are used in an anti-counterfeit medium, and thus, the anti-counterfeit effect may decrease. Moreover, if the taggant particle size is too small, it may be difficult to provide desired identification information item and to observe the taggant particles using a simple magnifying mechanism, which brings about the need to use a higher-precision magnifying mechanism and makes authenticity determination complicated.

Incidentally, the particle size is generally used to express a granularity of particles, and in the invention, the particle size is a particle size of a taggant particle in a plan view of the front surface of the taggant particle. For example, when the taggant particle has a larger diameter L1 and a shorter diameter L2 as illustrated in FIG. 4A, the larger diameter L1 is defined as the particle size L of the taggant particle.

Moreover, in the invention, the particle size of the taggant particle is a value measured by a laser method. The laser method is a method of measuring an average particle size, a granularity distribution, and the like by dispersing particles in a solvent, irradiating the dispersion solvent with a laser beam to obtain scattering beams, and converging and calculating the scattering beams. The particle size is a value measured using a granularity analyzer (Microtrack UPA Model-9230™: product of Leeds & Northrup Co. UK) as a particle size measuring instrument based on the laser method.

When the front surface of the taggant particle used in the invention has a solid shape, the thickness of the taggant particle is not particularly limited as long as the thickness allows desired identification information item to be formed on the front surface of the taggant particle. Above all, the thickness is preferably in a range of 0.1 µm to 500 µm, and more preferably, in a range of 1 µm to 100 µm.

If the thickness of the taggant particle is in the above range, it is possible to easily visually perceive identification information on a shape based on reflection of light and to easily identify the identification information item. On the other hand, it may be difficult to manufacture the taggant particle if the thickness of the taggant particle is large, and it may be difficult to provide desired identification information item to the front surface of the taggant particle if the thickness of the taggant particle is small.

Incidentally, the thickness of the taggant particle means the thickness of the taggant particle on a cross-section approximately perpendicular to the rear surface of the taggant particle. For example, the thickness means the thickness $H_T$ of the taggant particle as illustrated in FIG. 4B.

Here, the "approximately perpendicular cross-section" means that the angle between the approximately perpendicular cross-section and the rear surface of the taggant particle is within a range of 90°±10°.

Moreover, in the invention, the particle size (L) of the taggant particle and the thickness ($H_T$) of the taggant particle preferably satisfy a relation of $H_T/L \geq 1/100$. Above all, it is more preferable that the particle size (L) and the thickness ($H_T$) satisfy a relation of $H_T/L \geq 1/30$, and particularly preferably, $H_T/L \geq 1/20$, further preferably, $H_T/L \geq 1/10$.

This is because, if the ratio of the thickness of the taggant particle to the particle size of the taggant particle is in the above range, it is possible to easily visually perceive the identification information on a shape based on reflection of light and to easily identify the identification information item. On the other hand, it may be difficult to manufacture the taggant particle if the ratio is larger than the above range, and it may be difficult to provide desired identification information item if the ratio is smaller than the above range.

The particle size (L) and the thickness ($H_T$) of the taggant particle can be measured by a destructive or non-destructive inspection method.

5. Taggant Particle Group

As for the purposes of the taggant particle group according to the invention, due to its excellent anti-counterfeit effect, the taggant particle group can be used in paper money, stock certificates, credit cards, ID card, passports, high-priced products, auto parts, precision device parts, household electronic appliances, cosmetics, pharmaceuticals, food, OA supplies, sports equipment, CD, DVD, software, cigarettes, liquor, and the like.

B. Anti-Counterfeiting Ink

The anti-counterfeit ink according to the invention comprises the above-described taggant particle group.

According to the invention, since the anti-counterfeit ink comprises the taggant particle group, it is possible to obtain an anti-counterfeit medium that has an excellent anti-counterfeit effect by using the anti-counterfeit ink according to the invention. Moreover, when an anti-counterfeit medium is formed using the anti-counterfeit ink according to the invention, it is possible to easily disperse and fix the taggant particles on a support by applying the anti-counterfeit ink on the support. Thus, it is possible to expand the range of choice for materials that can be used as the support of the anti-counterfeit medium.

Hereinafter, respective configurations of the anti-counterfeit ink according to the invention will be described.

1. Taggant Particle Group

The taggant particle group used in the invention has been described in Section "A. Taggant Particle Group", and description thereof will not be provided here.

The content of the taggant particle group in the anti-counterfeit ink is not particularly limited as long as authenticity determination based on the taggant particle group is possible when the anti-counterfeit ink according to the invention is used in the anti-counterfeit medium, and the content may be in the range of approximately 0.01 mass % to approximately 50 mass %.

2. Transparent Resin Component

The anti-counterfeit ink according to the present invention is generally one in which taggant particles are dispersed in a transparent resin component.

The light transmitting properties of the transparent resin component used in the invention are not particularly limited as long as the taggant particles can be observed when a taggant particle-containing layer in which taggant particles are dispersed in the transparent resin is formed using the anti-counterfeit ink according to the invention. The total light transmittance in the visible range when the transparent resin component is formed in a predetermined thickness is preferably 10% or more.

Incidentally, the total light transmittance is a value measured according to JIS K7105.

The transparent resin component is not particularly limited as long as the transparent resin component has the above-described light transmitting properties, and for example, any of a photo-curable resin component, a thermosetting resin component, and a thermoplastic resin component can be used. Among these resin components, a curable resin component such as a photo-curable resin component or a thermosetting resin component is preferable, and a photo-curable resin component is particularly preferable. This is because the use of the photo-curable resin component enables the anti-counterfeit ink according to the invention to be applied to a support having low heat resistance, and expands the range of choice for purposes. Moreover, when the taggant particle-containing layer in which taggant particles are dispersed in a transparent resin is formed using the anti-counterfeit ink according to the invention, it is possible to improve the production efficiency.

3. Functional Material

The anti-counterfeit ink according to the invention may further contain a functional material such as an ultraviolet emitting material, an infrared emitting material, an infrared reflecting material, an infrared absorbing material, or a quantum dot material in addition to the taggant particle group and transparent resin component described above.

For example, when the anti-counterfeit ink contains an ultraviolet emitting material or an infrared emitting material, and a taggant particle that contains an ultraviolet emitting material or an infrared emitting material is not present in the taggant particle group, it is possible to identify the position of the taggant particle based on presence of light emission, to facilitate authenticity determination, and to improve the anti-counterfeit effect.

Moreover, when the anti-counterfeit ink contains an ultraviolet emitting material or an infrared emitting material, and a taggant particle that contains an ultraviolet emitting material or an infrared emitting material is present in the taggant particle group, it is possible to identify the position of the taggant particle based on the emission wavelength, to facilitate authenticity determination, and to improve the anti-counterfeit effect.

When the anti-counterfeit ink contains an infrared reflecting material or an infrared absorbing material, and a taggant particle that contains an infrared reflecting material or an infrared absorbing material is not present in the taggant particle group, it is possible to identify the position of the taggant particle based on the presence of absorption or reflection of infrared rays, to facilitate authenticity determination, and to improve the anti-counterfeit effect.

Moreover, when the anti-counterfeit ink contains an infrared reflecting material or an infrared absorbing material, and a taggant particle that contains an infrared reflecting material or an infrared absorbing material is present in the taggant particle group, it is possible to identify the position of the taggant particle based on the wavelength of absorbed or reflected infrared rays, to facilitate authenticity determination, and to improve the anti-counterfeit effect.

When the anti-counterfeit ink contains a quantum dot material, and a taggant particle that contains a quantum dot material is not present in the taggant particle group, it is possible to identify the position of the taggant particle based on the presence of light emission, to facilitate authenticity determination, and to improve the anti-counterfeit effect.

Moreover, when the anti-counterfeit ink contains a quantum dot material, and a taggant particle in the taggant particle group also contains a quantum dot material, it is possible to identify the position of the taggant particle based on the emission wavelength, to facilitate the authenticity determination, and to improve the anti-counterfeit effect.

Incidentally, the functional material has been described in Section "A. Taggant Particle Group", and description thereof will not be provided here.

The content of the ultraviolet emitting material in the anti-counterfeit ink is not particularly limited as long as the identification information item can be identified based on emission, and the content may be in a range of approximately 1 mass % to approximately 50 mass %.

The content of the infrared emitting material in the anti-counterfeit ink is not particularly limited as long as the identification information item can be identified based on emission, and the content may be in a range of approximately 1 mass % to approximately 50 mass %.

The content of the infrared reflecting material in the anti-counterfeit ink is not particularly limited as long as the identification information item can be identified based on reflection of infrared rays, and the content may be in a range of approximately 0.1 mass % to approximately 50 mass %.

The content of the infrared absorbing material in the anti-counterfeit ink is not particularly limited as long as the identification information item can be identified based on absorption of infrared rays, and the content is preferably in a range of 0.1 mass % to 10 mass %. This is because, if the content of the infrared absorbing material is in the above range, it is possible to obtain a sufficient infrared absorbing function and to transmit a sufficient amount of visible rays.

The content of the quantum dot material in the anti-counterfeit ink is not particularly limited as long as the identification information item can be identified based on emission, and the content may be in a range of approximately 0.1 mass % to approximately 50 mass %.

4. Solvent

The anti-counterfeit ink according to the invention may contain a solvent. The solvent is not particularly limited as long as the taggant particle and transparent resin component described above are dispersed in the solvent, and the solvent is appropriately selected according to an application method of the anti-counterfeit ink. Moreover, the solvent may be used solely, and a mixture of two or more solvents may be used.

Examples of the solvent include, when used as an ink for gravure printing, toluene, ethyl acetate, methyl ethyl ketone, and isopropyl alcohol. When used as an ink for offset printing or an ink for silk screen process printing, examples of the solvent include high boiling point petroleum-based solvents (C15 or higher hydrocarbons).

The solid content density of the anti-counterfeit ink according to the invention is not particularly limited as long as the anti-counterfeit ink can be applied to an anti-counterfeit medium, and the solid content density may be in a range of approximately 20 mass % to approximately 85 mass %.

C. Anti-Counterfeiting Toner

The anti-counterfeit toner according to the invention comprises the above-described taggant particle group.

In the invention, since the anti-counterfeit toner contains the taggant particle group, it is possible to obtain an anti-counterfeit medium having an excellent anti-counterfeit effect by using the anti-counterfeit toner according to the invention. Moreover, when the anti-counterfeit toner according to the invention is applied to an anti-counterfeit medium, since the taggant particle can be easily fixed onto a support by transferring the anti-counterfeit toner according to the invention onto the support, it is possible to provide advantages that the anti-counterfeit toner can be used in various supports, and the range of choice for the shape and the like of the support is broad.

The anti-counterfeit toner according to the invention may be any of dry toner and wet toner as long as the toner comprises the taggant particle group, and the anti-counterfeit toner may have a general composition. The anti-counterfeit toner according to the invention may contain a main resin, an auxiliary resin, a coloring agent, a charge control agent, a fluidity control agent, and the like, for example.

The main resin is not particularly limited as long as the main resin exhibits light permeability and can disperse the taggant particle group therein. Light permeability of the main resin can be adjusted to the light permeability of the transparent resin component in the anti-counterfeit ink described above. As the main resin, a styrene-acrylic resin or a polyester-based resin is mainly used. As an auxiliary resin, polypropylene, polyethylene, or a WAX-based resin is used. The main resins or auxiliary resins may be used singly, or two or more kinds may also be used as mixtures.

Examples of colorants that may be used include carbon, cyan pigments, magenta pigments, and yellow pigments. Charge control agents are classified into positive charge control agents and negative charge control agents, and examples thereof include metal-containing compounds, resin-based compounds, and quaternary ammonium salts. Furthermore, as a flow control agent, silica or the like is used.

Incidentally, the taggant particle group may have the same configuration as the taggant particle group of the anti-counterfeit ink described above, and description thereof will not be provided here.

The anti-counterfeit toner according to the invention may further contain a functional material such as an ultraviolet emitting material, an infrared emitting material, an infrared reflecting material, an infrared absorbing material, or a quantum dot material. The functional material may have the same configuration as the functional material of the anti-counterfeit ink described above.

D. Anti-Counterfeiting Sheet

The anti-counterfeit sheet according to the invention comprises the above-described taggant particle group.

Moreover, the anti-counterfeit sheet according to the invention is not particularly limited as long as the anti-counterfeit sheet comprises the taggant particle group, the anti-counterfeit sheet may have a taggant particle-containing layer that contains a taggant particle group (first aspect) and may have the shape of the taggant particle formed on a sheet (second aspect).

Hereinafter, the respective aspects will be described.

1. First Aspect

The anti-counterfeit sheet according to this aspect comprises a taggant particle-containing layer that contains a taggant particle group.

The anti-counterfeit sheet according to this aspect will be described with reference to the drawings.

Figure 7:
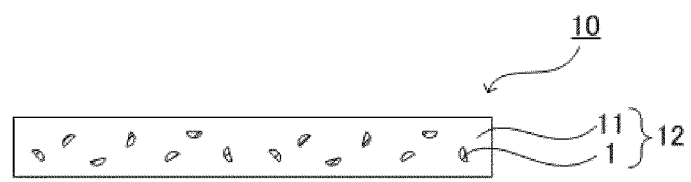
FIG. 7 is a schematic cross-sectional view illustrating an example of an anti-counterfeit sheet according to the invention.

FIG. 7 is a schematic cross-sectional view illustrating an example of an anti-counterfeit sheet according to this aspect. The anti-counterfeit sheet 10 illustrated in FIG. 7 is made up of a taggant particle-containing layer 12 in which predetermined taggant particles 1 are dispersed in a transparent resin 11.

In this aspect, since the anti-counterfeit sheet has a taggant particle-containing layer that contains the above-described taggant particle, it is possible to obtain an anti-counterfeit medium having an excellent anti-counterfeit effect by using the anti-counterfeit sheet according to this aspect. Moreover, when the taggant particles are applied to an anti-counterfeit medium, and if the amount of taggant particle-containing ink applied onto a support is small, there is possibility that the taggant particles are not present on the support, and it may be not possible to obtain an anti-counterfeit effect. However, in this aspect, since the taggant particles are applied to the anti-counterfeit medium in a state where the number of taggant particles on the anti-counterfeit sheet is known, it is possible to reliably obtain the anti-counterfeit effect. Further, in this aspect, it is possible to perform mapping with respect to the position of the taggant particles in the anti-counterfeit sheet and to realize advanced anti-counterfeit. Moreover, it is possible to obtain an advantage that the anti-counterfeit sheet according to this aspect can be easily attached. Further, the anti-counterfeit sheet according to this aspect can be easily stacked on another sheet and can improve added values.

Figure 8:
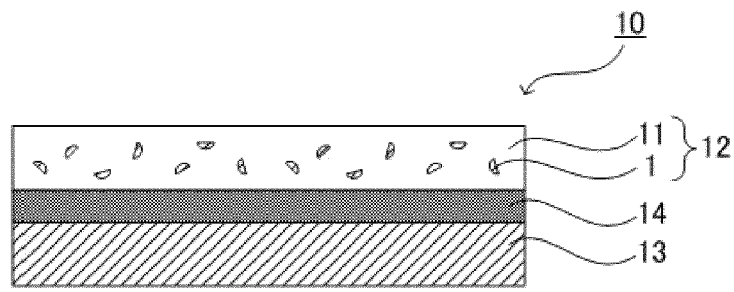
FIG. 8 is a schematic cross-sectional view illustrating another example of an anti-counterfeit sheet according to the invention.

FIG. 8 is a schematic cross-sectional view illustrating another example of the anti-counterfeit sheet according to this aspect. In the anti-counterfeit sheet 10 illustrated in FIG. 8, a delaminating layer 13, an adhesion layer 14, and a taggant particle-containing layer 12 in which predetermined taggant particles 1 are dispersed in a transparent resin 11 are stacked in that order.

Figure 9:
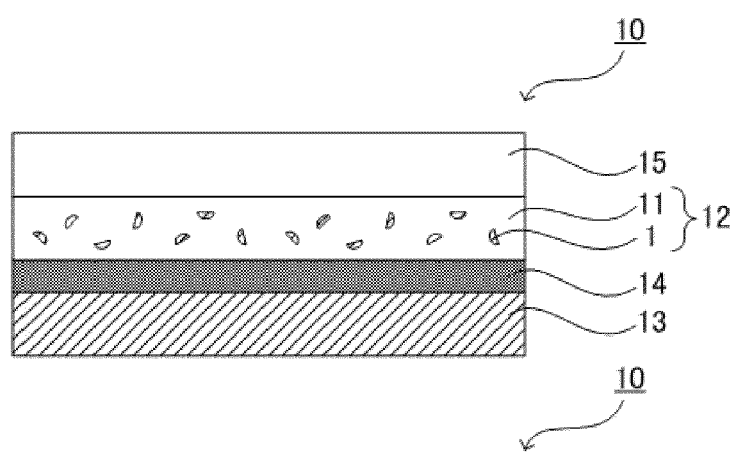
FIG. 9 is a schematic cross-sectional view illustrating another example of an anti-counterfeit sheet according to the invention.

FIG. 9 is a schematic cross-sectional view illustrating another example of the anti-counterfeit sheet according to this aspect. The anti-counterfeit sheet 10 illustrated in FIG. 9 includes a substrate 15 and a taggant particle-containing layer 12 which is formed on the substrate 15 and in which predetermined taggant particles 1 are dispersed in a transparent resin 11. An adhesion layer 14 and a delaminating layer 13 are stacked in that order on a side closer to the taggant particle-containing layer 12.

Figure 10:
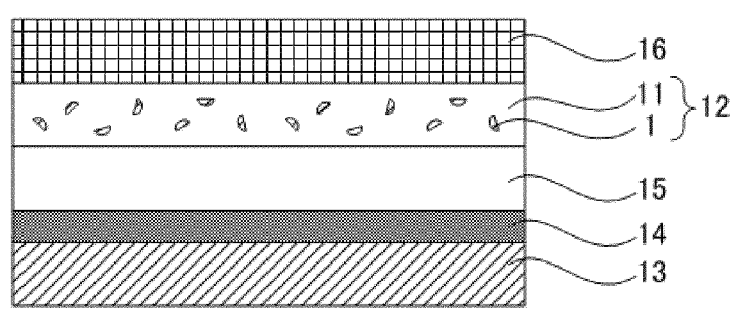
FIG. 10 is a schematic cross-sectional view illustrating another example of an anti-counterfeit sheet according to the invention.

FIG. 10 is a schematic cross-sectional view illustrating another example of the anti-counterfeit sheet according to this aspect. The anti-counterfeit sheet 10 illustrated in FIG. 10 includes a substrate 15, a taggant particle-containing layer 12 which is formed on the substrate 15 and in which predetermined taggant particles 1 are dispersed in a transparent resin 11, and a hard coat layer 16 formed on the taggant particle-containing layer 12. An adhesion layer 14 and a delaminating layer 13 are stacked in that order on a side closer to the substrate 15.

Figure 11:
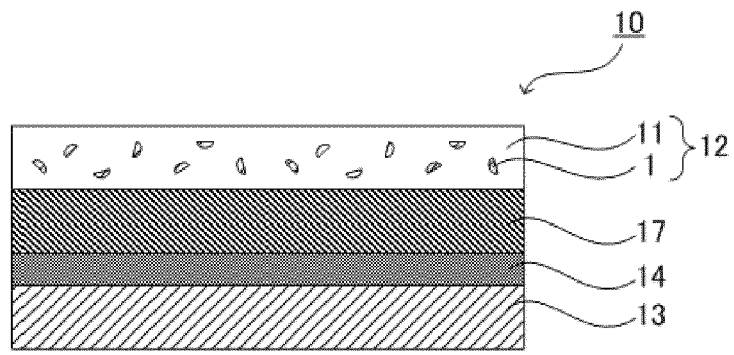
FIG. 11 is a schematic cross-sectional view illustrating another example of an anti-counterfeit sheet according to the invention.

FIG. 11 is a schematic cross-sectional view illustrating another example of the anti-counterfeit sheet according to this aspect. In the anti-counterfeit sheet 10 illustrated in FIG. 11, a delaminating layer 13, an adhesion layer 14, a hologram layer 17, and a taggant particle-containing layer 12 in which predetermined taggant particles 1 are dispersed in a transparent resin 11 are stacked in that order.

Figure 12:
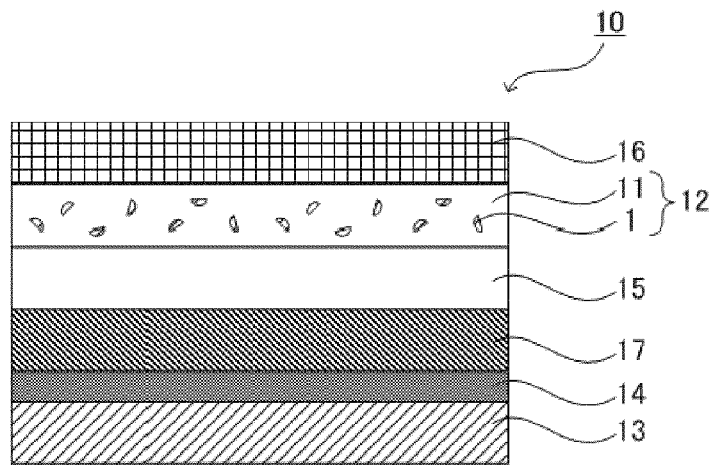
FIG. 12 is a schematic cross-sectional view illustrating another example of an anti-counterfeit sheet according to the invention.

FIG. 12 is a schematic cross-sectional view illustrating another example of the anti-counterfeit sheet according to this aspect. The anti-counterfeit sheet 10 illustrated in FIG. 12 includes a substrate 15, a taggant particle-containing layer 12 which is formed on the substrate 15 and in which predetermined taggant particles 1 are dispersed in a transparent resin 11, and a hard coat layer 16 formed on the taggant particle-containing layer 12. A hologram layer 17, an adhesion layer 14, and a delaminating layer 13 are stacked in that order on a side closer to the substrate 15.

As described above, the anti-counterfeit sheet according to this aspect may include another configuration other than the taggant particle-containing layer.

Hereinafter, respective configurations of the anti-counterfeit sheet according to this aspect will be described.

(1) Taggant Particle-Containing Layer

The taggant particle-containing layer according to this aspect is one in which the above-described taggant particle group is dispersed in a transparent resin.

Incidentally, the taggant particle group has been described in Section "A. Taggant Particle Group", and description thereof will not be provided here.

The light transmitting properties of the transparent resin used in the aspect are not particularly limited as long as the taggant particles in the taggant particle-containing layer can be observed. The total light transmittance in the visible range when a layer made from a transparent resin is formed in the same thickness as the taggant particle-containing layer is preferably 10% or more.

Incidentally, the total light transmittance is a value measured according to JIS K7105.

The transparent resin is not particularly limited as long as the transparent resin has the above-described light transmitting properties, and for example, any of a photo-curable resin, a thermosetting resin, and a thermoplastic resin can be used. Among these resins, a curable resin such as a photo-curable resin or a thermosetting resin is preferable, and a photo-curable resin is particularly preferable. This is because, for example, as illustrated in FIGS. 9, 10, and 12, when the taggant particle-containing layer 12 is formed on the substrate 15, the use of a photo-curable resin enables the anti-counterfeit sheet to use a substrate having low heat resistance, and expands the range of choice for purposes. Moreover, it is possible to improve the production efficiency of the anti-counterfeit sheet.

The transparent resin can be obtained by curing the transparent resin component described in Section "B. Anti-Counterfeiting Ink".

The content of the taggant particle group in the taggant particle-containing layer is not particularly limited as long as authenticity determination based on taggant particles is possible when the anti-counterfeit sheet according to this aspect is used in an anti-counterfeit medium. At least one taggant particle is preferably contained in 1 $cm^2$ of the taggant particle-containing layer.

Moreover, when the taggant particle-containing layer is formed on a substrate, the taggant particle-containing layer may be formed on one surface of the substrate and may be formed in a pattern shape. When the pattern shape of the taggant particle-containing layer is a shape that expresses a predetermined meaning, it is possible to improve the anti-counterfeit effect by using the taggant particles as high-level authentication information.

The thickness of the taggant particle-containing layer is not particularly limited as long as the authenticity determination based on the taggant particles is possible when the anti-counterfeit sheet according to this aspect is used in an anti-counterfeit medium, and the thickness is appropriately selected according to a layer configuration of the anti-counterfeit sheet according to this aspect, the type of the transparent resin included in the taggant particle-containing layer, and the like. For example, as illustrated in FIGS. 9, 10, and 12, when the taggant particle-containing layer 12 is formed on the substrate 15, the thickness of the taggant particle-containing layer 12 may be relatively small. On the other hand, as illustrated in FIG. 7, when the taggant particle-containing layer 12 is formed solely, the thickness of the taggant particle-containing layer is preferably relatively large from the perspective of self-supporting properties. Moreover, when the transparent resin included in the taggant particle-containing layer is a curable resin, the thickness of the taggant particle-containing layer is preferably relatively small from the perspective of suppressing breaking.

Specifically, the thickness of the taggant particle-containing layer is in a range of approximately 0.1 µm to approximately 500 µm, and preferably in a range of 1 µm to 100 µm.

An example of a method of forming the taggant particle-containing layer involves applying and curing the above-described anti-counterfeit ink. For example, as illustrated in FIGS. 9, 10, and 12, when the taggant particle-containing layer 12 is formed on the substrate 15, the taggant particle-containing layer 12 can be formed by applying an anti-counterfeit ink onto the substrate 15 and curing the anti-counterfeit ink.

Moreover, as illustrated in FIG. 7, when the taggant particle-containing layer 12 is formed solely, it is possible to obtain the taggant particle-containing layer 12 solely by applying an anti-counterfeit ink onto a substrate, curing the anti-counterfeit ink, and then delaminating the taggant particle-containing layer 12 from the substrate. The substrate used in this case may and may not have light transmitting properties, and for example, a glass substrate, a resin substrate, and the like can be used.

An optional application of the anti-counterfeit ink can be used.

Moreover, a method of curing the anti-counterfeit ink is appropriately selected according to the type of the transparent resin. In the case of curable resins, a curing method based on light or heat is used. In the case of thermoplastic resins, a cooling method is used.

(2) Substrate

In this aspect, as illustrated in FIGS. 9, 10, and 12, the taggant particle-containing layer 12 may be formed on the substrate 15. This is because it is possible to increase the rigidity of the anti-counterfeit sheet according to this aspect and to handle the anti-counterfeit sheet easily. Above all, when the transparent resin included in the taggant particle-containing layer is a curable resin, since it is preferable that the taggant particle-containing layer is relatively thin from the perspective of suppressing breaking of the taggant particle-containing layer, the taggant particle-containing layer is preferably formed on a transparent substrate. Moreover, when the anti-counterfeit sheet according to this aspect is applied to an anti-counterfeit medium, if as illustrated in FIG. 9, the transparent substrate 15 is disposed closer to the front surface side than the taggant particle-containing layer 12, it is possible to protect the taggant particle-containing layer with the transparent substrate. In the case of the layer configuration illustrated in FIG. 10, a non-transparent substrate may be used.

The substrate used in the invention may or may not have light transmitting properties, and whether the substrate has light transmitting properties is appropriately selected according to the formation position of the substrate. When the anti-counterfeit sheet according to the invention is applied to an anti-counterfeit medium, if as illustrated in FIG. 9, the substrate 15 is disposed closer to the front surface side than the taggant particle-containing layer 12, or as illustrated in FIG. 12, the substrate 15 is disposed closer to the front surface side than the hologram layer 17, the substrate preferably has light transmitting properties.

On the other hand, when the anti-counterfeit sheet according to the invention is applied to the anti-counterfeit medium, if as illustrated in FIG. 10, the substrate 15 is disposed closer to the rear surface side than the taggant particle-containing layer 12, the substrate may or may not have light transmitting properties.

When the substrate used in this aspect has light transmitting properties, although the light transmitting properties are not particularly limited as long as the taggant particles in the taggant particle-containing layer can be observed, the total light transmittance in the visible range is preferably 10% or more.

Moreover, the substrate preferably has flexible properties. This is because the anti-counterfeit sheet according to this aspect can be applied to anti-counterfeit media having various shapes.

Regarding such a substrate, any general resin substrate can be used. Examples thereof include resin substrates such as polyethylene terephthalate, polyvinyl chloride, polycarbonate, polypropylene, polyethylene, polystyrene, polyallylate, triacetyl cellulose, diacetyl cellulose, polymethyl methacrylate, polyimide, and polyamide.

Moreover, an adhesion facilitating treatment is preferably performed on the surface of the substrate in order to improve adhesion with the taggant particle-containing layer. The adhesion facilitating treatment is not particularly limited as long as the taggant particle-containing layer and the substrate can be attached together, and examples of the treatment include a physical treatment such as a plasma treatment, a corona discharge process, a glow discharge treatment, or a flame treatment, and a chemical treatment using a chromic acid, a silane coupling agent, a primer agent, or the like.

Above all, a chemical treatment using a primer agent is preferable. The primer agent is preferable in any of the case where the treatment is performed during manufacturing of the transparent substrate and the case where the treatment is performed on the surface of the transparent substrate after manufacturing. Those commercially available can be used as the transparent substrate treated with the primer agent. Moreover, the primer agent that processes the surface of the transparent substrate after manufacturing may adhere to the anti-counterfeit ink.

The thickness of the substrate is appropriately selected according to the purpose, the type, and the like of the anti-counterfeit sheet according to this aspect, and the thickness is in a range of approximately 1 μm to approximately 800 μm, and preferably, in a range of 10 μm to 50 μm.

(3) Adhesion Layer

In this aspect, as illustrated in FIGS. 8 to 12, the adhesion layer 14 may be stacked on the taggant particle-containing layer 12. This is because the anti-counterfeit sheet according to this aspect can be attached by the adhesion layer.

When the taggant particle-containing layer is formed on the substrate, the adhesion layer may be stacked on the substrate or may be stacked on the taggant particle-containing layer. When the hard coat layer described later is formed on the taggant particle-containing layer, the adhesion layer is disposed on a surface opposite to the hard coat layer. Moreover, when the taggant particle-containing layer and the hologram layer are stacked, the adhesion layer is disposed on the hologram layer.

The material of the adhesion layer is not particularly limited as long as the anti-counterfeit sheet according to this aspect can be attached by the adhesion layer. For example, any of thermoplastic materials, heat-curable materials, photo-curable materials, and elastomer materials can be used, and the material is appropriately selected according to the purpose and the type of the anti-counterfeit sheet. When the anti-counterfeit sheet is used as a transfer foil, an adhesion layer having heat sealing properties is used.

The thickness of the adhesion layer is not particularly limited as long as the anti-counterfeit sheet according to this aspect can be attached by the adhesion layer, and for example, the thickness may be in a range of approximately 1 μm to approximately 100 μm.

An existing adhesion layer forming method can be used.

(4) Delaminating Layer

In this aspect, as illustrated in FIGS. 8 to 12, the adhesion layer 14 and the delaminating layer 13 may be stacked in that order on the taggant particle-containing layer 12. This is because, when the adhesion layer and the delaminating layer are stacked, it is easy to handle the anti-counterfeit sheet according to this aspect.

The delaminating layer is delaminated when the anti-counterfeit sheet according to this aspect is applied to an anti-counterfeit medium.

The delaminating layer is not particularly limited as long as the layer has delaminating properties, and for example, a general resin substrate can be used.

(5) Hard Coat Layer

In this aspect, as illustrated in FIGS. 10 and 12, the hard coat layer 16 may be formed on the taggant particle-containing layer 12. This is because the taggant particle-containing layer can be protected by the hard coat layer.

The hard coat layer is disposed so that the hard coat layer 16 is located closer to the front surface than the taggant particle-containing layer 12 as illustrated in FIGS. 10 and 12 when the anti-counterfeit sheet according to this aspect is applied to the anti-counterfeit medium.

The hard coat layer has light transmitting properties. The light transmitting properties of the hard coat layer are not particularly limited as long as the taggant particles in the taggant particle-containing layer can be observed, and the total light transmittance in the visible range is preferably 10% or more. Above all, the total light transmittance is preferably 50% or more, and particularly preferably, 80% or more.

The material of the hard coat layer is not particularly limited as long as the material can satisfy the above-described light transmitting properties and can protect the taggant particle-containing layer, and for example, a photo-curable resin can be used.

The thickness of the hard coat layer is not particularly limited as long as the hard coat layer can protect the taggant particle-containing layer, and for example, the thickness may be in a range of approximately 1 μm to approximately 100 μm.

An existing hard coat layer forming method can be used.

(6) Hologram Layer

In this aspect, as illustrated in FIGS. 11 and 12, the hologram layer 17 may be stacked on the taggant particle-containing layer 12. This is because the hologram layer can improve the anti-counterfeit effect.

The type of the hologram layer is not particularly limited, and the hologram layer may be a relict hologram layer or may be a volume hologram layer. The relief hologram layer provides excellent productivity while the volume hologram layer provides an excellent anti-counterfeit effect.

An existing hologram layer can be used.

The hologram layer is disposed so that the hologram layer 17 is located closer to the rear surface than the taggant particle-containing layer 12 as illustrated in FIGS. 11 and 12 when the anti-counterfeit sheet according to this aspect is applied to the anti-counterfeit medium. In this manner, the taggant particle-containing layer can be used as a protection layer of the hologram layer.

(7) Anti-Counterfeit Sheet

The anti-counterfeit sheet according to this aspect may be formed in a sheet shape and may be formed in an elongated shape.

Moreover, the shape of the anti-counterfeit sheet according to this aspect is not particularly limited, and the anti-counterfeit sheet may have an optional shape such as a triangular shape, a tetragonal shape, or a circular shape. Moreover, when the anti-counterfeit sheet according to this aspect has a shape that expresses a predetermined meaning, since the taggant particles can be used as high-level authentication information, it is possible to obtain an anti-counterfeit sheet having an excellent anti-counterfeit effect.

Figure 13:
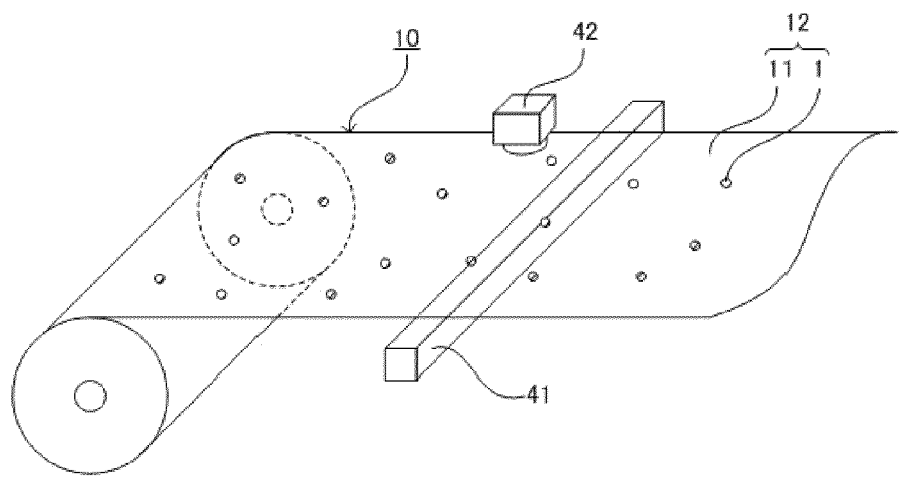
FIG. 13 is a schematic view illustrating an example of a method of inspecting an anti-counterfeit sheet according to the invention.

An example of a method of inspecting the anti-counterfeit sheet according to this aspect involves irradiating the anti-counterfeit sheet 10 with light using an LED lamp 41 and capturing an image using a camera (line sensor) 42 as illustrated in FIG. 13. In FIG. 13, although the LED lamp 41 is disposed on a side of the anti-counterfeit sheet 10 opposite to the camera 42 to observe transmitted beams, an LED lamp may be disposed on the same side of the anti-counterfeit sheet as the camera to observe reflected beams though not illustrated in the drawing.

The anti-counterfeit sheet inspecting device can map the positions of the taggant particles, store the positions in a database, and verify the positions.

During inspection, when there is a region where taggant particles are not contained in the taggant particle-containing layer, a mark may be put on the region where the taggant particles are not contained using a laser marking device so that the region is not used when the anti-counterfeit sheet is formed in a predetermined shape.

The anti-counterfeit sheet according to this aspect can be used as a label as it is or may be used as a transfer foil. Moreover, when the anti-counterfeit sheet has a hologram layer, the anti-counterfeit sheet can be used as a hologram label or a hologram transfer foil. Further, the anti-counterfeit sheet can be used as a laminate film on an anti-counterfeit medium.

Since the anti-counterfeit sheet itself can have light transmitting properties, the anti-counterfeit sheet can be applied to various anti-counterfeit media.

Moreover, when the anti-counterfeit sheet according to this aspect is applied to an anti-counterfeit medium, the anti-counterfeit sheet may be secured to the surface of the anti-counterfeit medium. When the anti-counterfeit medium is made up of a plurality of layers, the anti-counterfeit sheet may be embedded in the anti-counterfeit medium. When the anti-counterfeit medium is made up of paper, the anti-counterfeit sheet may be cut into long pieces and be inserted in the paper. When the anti-counterfeit sheet is secured to the surface of the anti-counterfeit medium, the anti-counterfeit sheet may be attached as it is and may be transferred by performing transfer foil processing. An example of the transfer method includes a heat transfer method.

Incidentally, the anti-counterfeit medium will be described in Section "E. Anti-Counterfeit Medium" to be described later, and description thereof will not be provided here.

2. Second Aspect

The anti-counterfeit sheet according to this aspect has the shape (hereinafter, referred to as an identification shape) of taggant particles on the sheet.

According to this aspect, it is possible to determine the number and the positions of identification shapes formed on a sheet having a predetermined area in advance. Thus, it is possible to obtain an anti-counterfeit sheet capable of controlling identification information in a more advanced manner and to manufacture an anti-counterfeit medium having an excellent anti-counterfeit effect.

Moreover, in the first aspect, since the taggant particle group is mixed into the transparent resin that forms the taggant particle-containing layer, there is a possibility that it is difficult to control the positions, directions, and the like of the contained taggant particles and to identify the identification information item of the taggant particles. However, according to this aspect, since the arrangement of the identification shapes can be controlled, it is possible to control the identification information item in a more advanced manner.

Figure 14A:
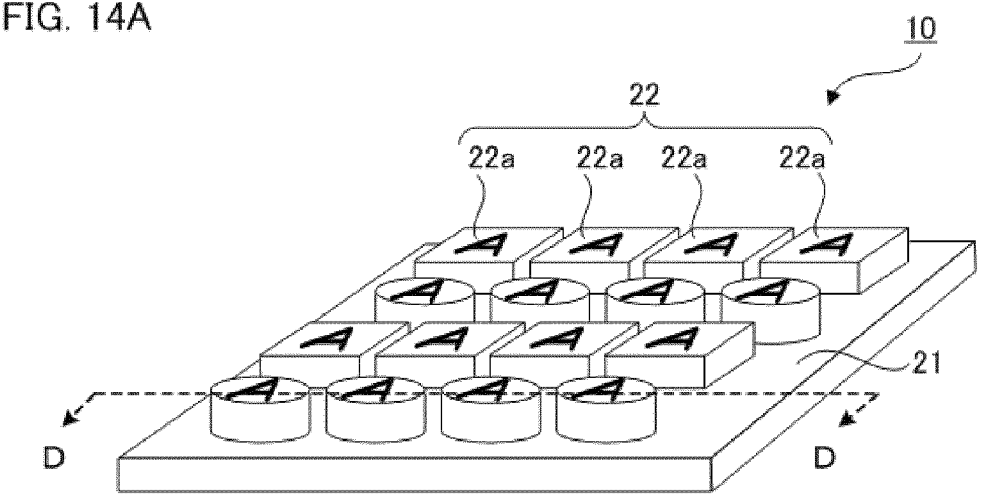
FIGS. 14A and 14B are each a schematic view illustrating another example of an anti-counterfeit sheet according to the invention.
Figure 14B:
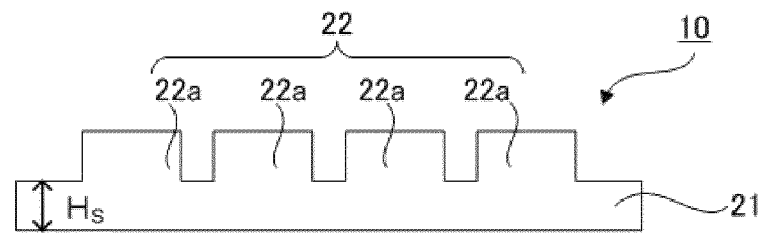

The anti-counterfeit sheet according to this aspect will be described with reference to the drawings. FIGS. 14A and 14B are schematic views illustrating an example of the anti-counterfeit sheet according to this aspect, in which FIG. 14A is a perspective view and FIG. 14B is a cross-sectional view along line D-D in FIG. 14A. As illustrated in FIGS. 14A and 14B, the anti-counterfeit sheet 10 according to this aspect includes a base portion 21 and an identification portion 22 in which a plurality of identification shapes 22a which are the taggant particle shapes is formed on the front surface of the base portion 21.

According to this aspect, since the identification shape formed in the identification portion has the common identification information and the non-common identification information similarly to the taggant particle group mentioned above, the anti-counterfeit sheet according to this aspect allows advanced authenticity determination and can manufacture an anti-counterfeit medium having an excellent anti-counterfeit effect.

(1) Identification Portion

The identification portion according to this aspect will be described. The identification portion according to this aspect is one in which the respective identification shapes of the identification portion have the common identification information and the non-common identification information.

(Identification Shape)

The identification shape used in this aspect is not particularly limited as long as the shape can have the common identification information and the non-common identification information, and the shape can have the same shape as the above-described taggant particles. Incidentally, the shape of the taggant particles has been described in Section "A. Taggant Particle Group", and description thereof will not be provided here.

The number of identification shapes included in the identification portion is not particularly limited as long as the number is 2 or more and is appropriately selected according to the purpose of the anti-counterfeit medium to which the anti-counterfeit sheet is applied. Above all, the number is preferably in a range of 10 to 1,000,000,000 and particularly, in a range of 100 to 1,000,000.

If the number of identification shapes formed in the identification portion is smaller than the above range, it may be difficult to identify the position of the identification shape and to recognize the identification information itself possessed by the identification shape. Incidentally, the number of identification shapes can be appropriately selected according to the purpose of the anti-counterfeit sheet according to this aspect.

The arrangement of the identification shapes in the identification portion is not particularly limited as long as the identification information displayed in the identification portion can be recognized, and the identification shapes may be arranged in a regular manner and may be arranged in a random manner.

(Common Identification Information)

The common identification information used in this aspect is not particularly limited as long as the common identification information is identification information that can be possessed in common by all identification shapes, and the common identification information item may be a shape, a size, a mark, and a color, for example. Incidentally, the respective identification information items are the same as those described in Section "A. Taggant Particle Group", and description thereof will not be provided here.

(Non-Common Identification Information)

The non-common identification information used in this aspect is not particularly limited as long as the non-common identification information is identification information that is different from the common identification information, and the non-common identification information can be preferably identified using a simple mechanism. Incidentally, the non-common identification information is the same as that described in Section "A. Taggant Particle Group", and description thereof will not be provided here.

(Others)

The identification portion used in this aspect is not particularly limited as long as the identification information items possessed by the respective identification shapes of the identification portion can be observed by magnifying the same using a simple mechanism. The identification portion may be formed on a partial surface of the anti-counterfeit sheet or may be formed on the entire surface of the anti-counterfeit sheet. Moreover, one identification portion may be formed on the anti-counterfeit sheet, and a plurality of identification portions may be formed on the anti-counterfeit sheet.

Moreover, the size of the entire identification portion used in this aspect is not particularly limited as long as the identification information items possessed by the respective identification shapes of the identification portion can be observed by magnifying the same, and the size can be appropriately selected according to the purpose of the anti-counterfeit sheet according to this aspect. Thus, the identification portion may have such a size that the entire identification portion can be perceived by visual inspections or the entire identification portion can be observed by magnifying the same.

(2) Base Portion

The base portion used in this aspect has the above-described identification portion formed on the surface thereof.

The thickness of the base portion used in this aspect is not particularly limited as long as the above-described identification portion can be formed on the surface of the base portion, and the anti-counterfeit sheet according to this aspect can be used in a desired anti-counterfeit medium. Specifically, the thickness is preferably in a range of 1 μm to 800 μm, and above all, more preferably, in a range of 10 μm to 50 μm.

If the thickness of the base portion is larger than the above range, since the anti-counterfeit sheet becomes thick, there is a possibility that it is difficult to process the anti-counterfeit sheet and the anti-counterfeit sheet may not comply with the specification of the anti-counterfeit medium to which the anti-counterfeit sheet is applied. On the other hand, if the thickness is smaller than the above range, there is a possibility that it is difficult to form the identification portion having a plurality of identification shapes and to provide sufficient self-supporting properties.

Incidentally, the thickness of the base portion used in this aspect represents the thickness Hs of a portion of the anti-counterfeit sheet 10 where the identification portion 22 is not formed as illustrated in FIG. 14B.

(3) Others

The material of the anti-counterfeit sheet according to this aspect is not particularly limited as long as it is possible to manufacture a desired anti-counterfeit sheet, and the same material as the material used for the transparent resin according to the first aspect can be used. The transparent resin material has been described in Section "1. First Aspect", and description thereof will not be provided here.

Moreover, the material of the anti-counterfeit sheet according to this aspect may have the functional material similarly to the first aspect. The functional material used may be the same as that described in Section "A. Taggant Particle Group", and description thereof will not be provided here.

The anti-counterfeit sheet according to this aspect may have the same shape, color, light transmitting properties, and the like as those of the first aspect, and description thereof will not be provided here.

The anti-counterfeit sheet according to this aspect is not particularly limited as long as the anti-counterfeit sheet has the identification portion and the base portion described above, and other configurations may be appropriately selected and used if necessary.

(Metal Layer)

The anti-counterfeit sheet according to the invention preferably has a metal layer formed on a surface of the anti-counterfeit sheet closer to the identification portion. This is because, if the metal layer is formed on the surface closer to the identification portion, it is possible to easily visually perceive the identification information on the shape based on reflection of light, to facilitate authenticity determination, and to improve the anti-counterfeit effect. In particular, when the hard coat layer is formed, since the hard coat layer is also formed using a resin, the refractive index difference between the anti-counterfeit sheet and the hard coat layer is small, so that it is difficult to visually perceive the interface between the anti-counterfeit sheet and the hard coat layer and to visually perceive the identification information on the shapes possessed by the anti-counterfeit sheet and the hard coat layer. However, since the metal layer is formed on the surface closer to the identification portion, it is possible to improve the visibility of the identification information on the shape.

The thickness of the metal layer is not particularly limited as long as it is possible to improve the visibility of the identification information on the shapes possessed by the respective identification shapes of the identification portion, and the thickness is in a range of approximately 1 nm to approximately 250 nm, and preferably, in a range of 10 nm to 100 nm.

This is because the identification information may be damaged if the thickness of the metal layer is larger than the above range, and it may be difficult to form the metal layer and to obtain a sufficient effect of improving the visibility of the identification information on the shape if the metal layer is too thin.

Metals, metal oxides, and metal compounds such as metal sulfides are used as the material of such a metal layer, and examples thereof include Al, ZnS, $TiO_2$, Cu, Au, and Pt.

Moreover, a metal layer forming method is not particularly limited as long as it is possible to form the metal layer in a desired thickness on the surface of the anti-counterfeit sheet closer to the identification portion, and examples of the forming method include a metal evaporation method, a metal plating method, and a sputtering method.

The anti-counterfeit sheet according to this aspect may include an optional configuration in addition to the metal layer, and examples of the optional configuration include a transparent substrate, an adhesion layer, a delaminating layer, a hard coat layer, and a hologram layer. Incidentally, the same configurations as used in the first aspect can be used as these configurations, and description thereof will not be provided here.

A method of manufacturing the anti-counterfeit sheet according to this aspect is not particularly limited as long as the method can form a desired identification shape on the surface of the anti-counterfeit sheet. An example of the method involves forming a transfer portion having such shape that the transfer portion engages with a plurality of identification shapes of the identification portion to form a master substrate and forming a resin-containing anti-counterfeit sheet forming layer on the surface of the substrate. Subsequently, the surface of the anti-counterfeit sheet forming layer is attached to the transfer portion of the master substrate so that the plurality of identification shapes of the identification portion is transferred to the surface of the anti-counterfeit sheet forming layer. The anti-counterfeit sheet forming layer to which the plurality of identification shapes is transferred is cured, and the master substrate is delaminated from the cured anti-counterfeit sheet forming layer to form the anti-counterfeit sheet.

E. Anti-Counterfeit Medium

The anti-counterfeit medium according to the invention includes the taggant particles described above.

Figure 15A:
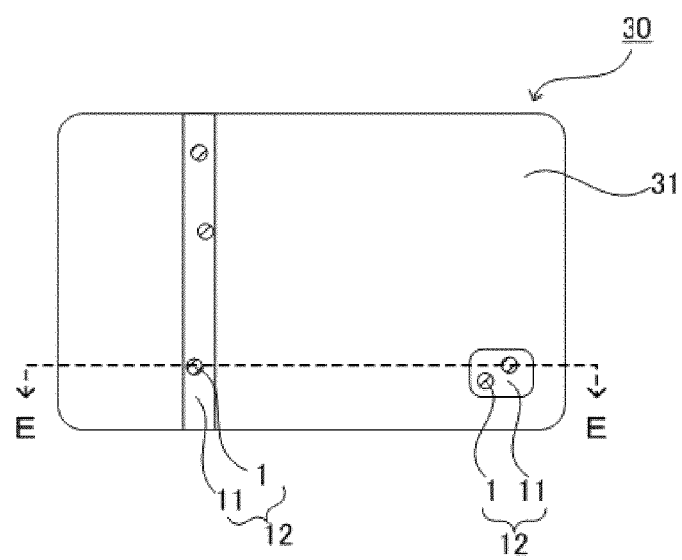
Figure 15B:
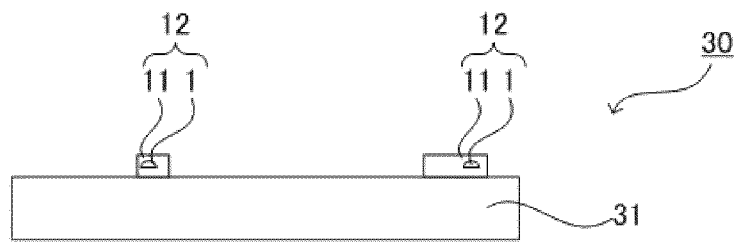

FIGS. 15A and 15B are schematic views illustrating an example of the anti-counterfeit medium according to the invention, in which FIG. 15A is a top view and FIG. 15B is a cross-sectional view along line E-E in FIG. 15A. In an anti-counterfeit medium 30 illustrated in FIGS. 15A and 15B, the taggant particle-containing layer 12 in which the taggant particles 1 are dispersed in the transparent resin 11 is formed on a support 31.

Figure 16A:
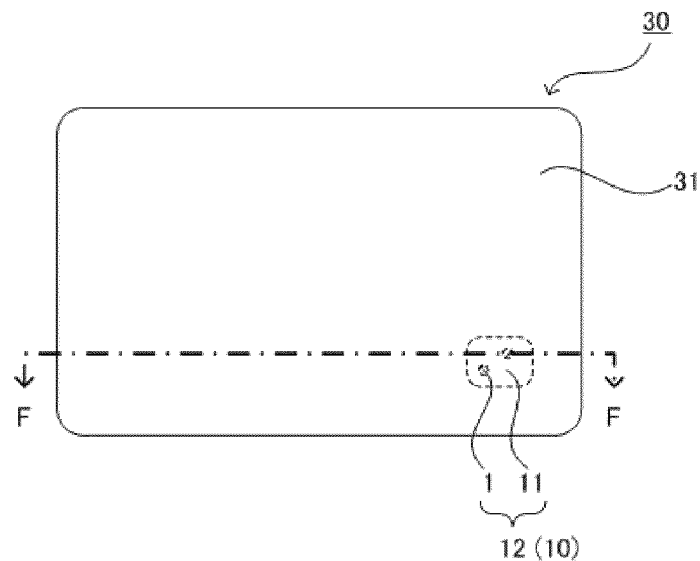
FIGS. 16A to 16C are each a schematic view illustrating another example of an anti-counterfeit medium according to the invention.
Figure 16B:
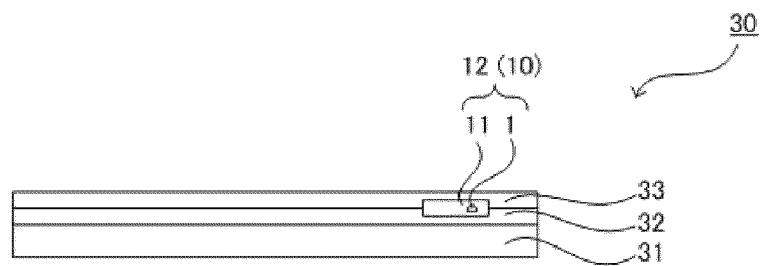
Figure 16C:
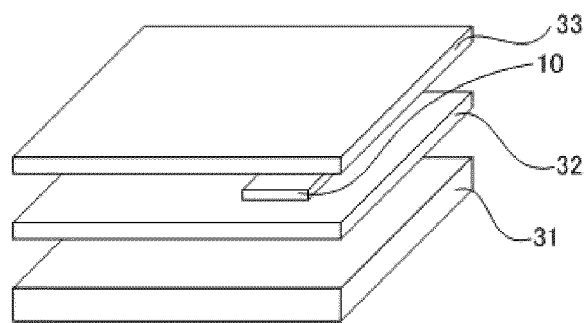

FIGS. 16A to 16C are schematic views illustrating another example of the anti-counterfeit medium according to the invention, in which FIG. 16A is a top view, FIG. 16B is a cross-sectional view along line F-F in FIG. 16A, and FIG. 16C is a perspective view illustrating a stacked structure of the anti-counterfeit medium. In the anti-counterfeit medium 30 illustrated in FIGS. 16A to 16C, a first resin layer 32, an anti-counterfeit sheet 10 made from the taggant particle-containing layer 12 in which the taggant particles 1 are dispersed in the transparent resin 21, and a second resin layer 33 are stacked on a support 31, and the anti-counterfeit sheet 10 is embedded in the anti-counterfeit medium 30. When the anti-counterfeit sheet is embedded in the anti-counterfeit medium, it is possible to prevent the anti-counterfeit sheet from being delaminated and used for illegal purposes.

Since the anti-counterfeit medium according to the invention uses the taggant particle group described above, the anti-counterfeit medium is very useful in anti-counterfeit. Moreover, in the invention, it is possible to easily perform authenticity determination using only a simple mechanism such as a loupe.

Hereinafter, respective configurations of the anti-counterfeit medium according to the invention will be described.

Incidentally, the taggant particle group has been described in detail in Section "A. Taggant Particle Group", and description thereof will not be provided here.

As a method of fixing the taggant particle group onto the support, a method of applying the anti-counterfeit ink onto the support and curing the anti-counterfeit ink and a method of attaching or embedding the anti-counterfeit sheet on the support can be used.

As a method of attaching the anti-counterfeit sheet onto the support, the anti-counterfeit sheet may be attached as it is or may be transferred. Further, when the anti-counterfeit medium is made up of a plurality of layers, the anti-counterfeit sheet may be embedded between the constituent layers of the anti-counterfeit medium.

Here, an example of a method of embedding the anti-counterfeit sheet involves stacking desired constituent layers on the support of the anti-counterfeit medium and attaching the respective layers using an adhesive layer, an adhesion layer, thermocompression, or the like.

Incidentally, the anti-counterfeit sheet stacked in the anti-counterfeit medium may be formed in a partial region and may be formed in an entire region. Moreover, other constituent layers in the anti-counterfeit medium may be appropriately selected according to the type of the anti-counterfeit medium.

The support used in the invention is appropriately selected according to the purpose of the anti-counterfeit medium according to the invention. The substrate may or may not have light transmitting properties. Examples of the substrate include glass, resins, metals, and paper.

Moreover, the first resin layer that constitutes the anti-counterfeit medium may or may not have light transmitting properties. Above all, the first resin layer preferably has light transmitting properties when a functional layer (for example, an image receiving layer, or a hologram layer) that can write or has optional information is formed between the support and the first resin layer. When the first resin layer has light transmitting properties, the light transmitting properties may be the same as the light transmitting properties when the substrate that constitutes the anti-counterfeit sheet is a transparent substrate. A general resin substrate can be used as the first resin layer, for example.

On the other hand, the second resin layer has light transmitting properties. The second resin layer may have the same light transmitting properties as when the substrate that constitutes the anti-counterfeit sheet is a transparent substrate. A general resin substrate can be used as the second resin layer, for example.

As a method of stacking the support, the first resin layer, the anti-counterfeit sheet, and the second resin layer, a method of stacking the respective layers with an adhesive layer interposed, and a method of stacking the respective layers according to thermocompression can be used, for example.

Examples of the purpose of the anti-counterfeit medium according to the invention include paper money, stock certificates, credit cards, ID card, passports, high-priced products, auto parts, precision device parts, household electronic appliances, cosmetics, pharmaceuticals, food, OA supplies, sports-equipment, CD, DVD, software, cigarettes, and liquor.

The invention is riot limited to the above embodiment. The above embodiment is an example, and any examples that have substantially the same configuration and demonstrate the same operational effects as those of the technical concept described in claims of the invention are included in the technical scope of the invention.

EXAMPLE

Hereinafter, the invention will be described in detail in connection with Example.
(Forming of Master Substrate)

A positive resist (LA900™: product of Tokyo Ohka Kogyo Co. Ltd.) was applied onto a glass substrate having a thickness of 0.7 mm using a spin coater to form a coating by heating at 130° C. for 10 minutes.

Incidentally, the thickness of the coating was adjusted so that the largest thickness was 2 µm after developing and curing.

Subsequently, the anti-counterfeit sheet illustrated in FIG. 14A was irradiated with ultraviolet rays having the wavelength 365 nm by an aligner using a gradation mask. The gradation mask has a density gradation corresponding to the pattern of the identification shapes of the anti-counterfeit sheet, in which regions having high transmittance to exposure light and having a rectangular or circular shape of 100 µm by 100 µm are periodically formed in a light blocking portion, and a region having the shape of character A and having higher transmittance is formed in a central portion of each of the rectangular or circular regions. Incidentally, the amount of exposure was 800 mJ.

After the exposure, the substrate was developed for 5 minutes using a developer (NMD-3™, product of Tokyo Ohka Kogyo Co. Ltd.) and was washed with pure water. In this way, a master substrate having such an uneven pattern that the thickness of the rectangular or circular regions is small, and the thickness of the region of the character A is smaller was formed.
(Forming of Anti-Counterfeit Sheet)

Subsequently, a polyethylene terephthalate (PET) film having a thickness of 110 µm was attached to the glass substrate having a thickness of 0.7 mm as a spacer. Incidentally, the PET film was disposed so that a space of which the bottom surface is the glass substrate and the side surface is the PET film is formed. An UV-curable resin was filled in the space to form an anti-counterfeit sheet forming layer, and the master substrate was disposed so that the transfer portions of the anti-counterfeit sheet forming layer and the master substrate was attached so as to occupy the above-described space.

The anti-counterfeit sheet forming layer was cured with 1000 mJ of ultraviolet rays having the wavelength 365 nm emitted by a UV irradiation machine from the master substrate side, and then, the master substrate and the glass substrate were separated, whereby the anti-counterfeit sheet was formed.

By the above steps, an anti-counterfeit sheet having the character A which is the common identification information and the shape (rectangle or circle) which is the non-common identification information was obtained.

Reference Signs List
1, 1A, 1B, 1C taggant particle
2, 2a, 2b identification information
3 ... multilayer metal film
4 ... front surface of taggant particle
5 ... rear surface of taggant particle
6 ... resin layer
7 ... metal layer
10 ... anti-counterfeit sheet
11 ... transparent resin
12 ... taggant particle-containing layer
13 ... delaminating layer
14 ... adhesion layer
15 ... substrate
16 ... hard coat layer
17 ... hologram layer
21 ... base portion
22 ... identification portion
22a ... identification shape
30 ... anti-counterfeit medium
31 ... support
32 ... first resin layer
33 ... second resin layer
41 ... led lamp
42 ... camera

The invention claimed is:

1. A taggant particle group which is an aggregate of taggant particles each of which has a plurality of identification information items, Wherein one or more identification information items among the plurality of identification information items possessed by each of the taggant particles that constitute the taggant particle group are common identification information that is possessed in common by the taggant particles that constitute the taggant particle group, and one or more identification information items other than the common identification information among the plurality of identification information items possessed by each of the taggant particles that constitute the taggant particle group are non-common identification information, the non-common identification information possessed by a first taggant particle among the taggant particles that constitute the taggant particle group and the non-common identification information possessed by a second taggant particle other than the first taggant particle among the taggant particles that constitute the taggant particle group are different identification information items from each other, authenticity of an anti-counterfeit medium comprising the taggant particle group is determined by a combination of the non-common identification information possessed by the first taggant particle and the non-common identification information possessed by the second taggant particle, and each of the plurality of identification information items is an information item selected from the group consisting of shape, a size, a mark and a color, the information item which can be identified by each of the taggant particles, and the information item which can be identified through observation using a simple magnifying mechanism.

2. An anti-counterfeit ink comprising the taggant particle group according to claim 1.

3. An anti-counterfeit toner comprising the taggant particle group according to claim 1.

4. An anti-counterfeit sheet comprising the taggant particle group according to claim 1.

5. An anti-counterfeit medium comprising the taggant particle group according to claim 1.

* * * * *